(12) United States Patent
Yun et al.

(10) Patent No.: US 12,276,731 B2
(45) Date of Patent: Apr. 15, 2025

(54) METHOD OF INDIVIDUAL TREE CROWN SEGMENTATION FROM AIRBORNE LiDAR DATA USING NOVEL GAUSSIAN FILTER AND ENERGY FUNCTION MINIMIZATION

(71) Applicant: NANJING MAOTING INFORMATION TECHNOLOGY CO., LTD., Nanjing (CN)

(72) Inventors: Ting Yun, Nanjing (CN); Kang Jiang, Nanjing (CN); Guangchao Li, Nanjing (CN); Yiduo Li, Nanjing (CN); Lin Cao, Nanjing (CN)

(73) Assignee: NANJING MAOTING INFORMATION TECHNOLOGY CO., LTD. (CN)

( * ) Notice: Subject to any disclaimer, the term of this patent is extended or adjusted under 35 U.S.C. 154(b) by 49 days.

(21) Appl. No.: 17/780,538

(22) PCT Filed: Sep. 30, 2020

(86) PCT No.: PCT/CN2020/119150
§ 371 (c)(1),
(2) Date: May 27, 2022

(87) PCT Pub. No.: WO2022/067598
PCT Pub. Date: Apr. 7, 2022

(65) Prior Publication Data
US 2023/0350065 A1  Nov. 2, 2023

(51) Int. Cl.
*G01S 17/89* (2020.01)
*G06V 20/10* (2022.01)

(52) U.S. Cl.
CPC ............ *G01S 17/89* (2013.01); *G06V 20/182* (2022.01)

(58) Field of Classification Search
CPC ..... G01S 17/89; G06V 20/182; G06V 20/188
See application file for complete search history.

(56) References Cited

FOREIGN PATENT DOCUMENTS

| CN | 104849722 A | 8/2015 |
| CN | 110223314 A | 9/2019 |
| CN | 110598707 A | 12/2019 |

OTHER PUBLICATIONS

Li. Xiang et al., "Suitable model of detecting the position of individual treetop based on local maximum method" Journal of Beijing Forest University, vol. 37, No. 3, Mar. 31, 2015, ISSN: 1000-1522, pp. 27-32.

*Primary Examiner* — Lam S Nguyen

(57) ABSTRACT

Provided are a method of individual tree crown segmentation from airborne LiDAR data using a novel Gaussian filter and energy function minimization. First, a dual Gaussian filter was designed with automated adaptive parameter assignment and a screening strategy for false treetops. This preserved the geometric characteristics of sub-canopy trees while eliminating false treetops. Second, anisotropic water expansion controlled by the energy function was applied to accurate crown segmentation. This utilized gradient information from the digital surface model and explored the morphological structures of tree crown boundaries as analogous to the maximal valley height difference from surrounding treetops. We demonstrate the generality of our approach using seven diverse plots in the subtropical Gaofeng Forest, China, coupled with ground verification. Our approach enhanced the detection rate of treetops and ITC segmentation relative to the marked-control watershed method, especially in complicated intersections of multiple crowns.

4 Claims, 11 Drawing Sheets

METHOD OF INDIVIDUAL TREE CROWN SEGMENTATION FROM AIRBORNE LiDAR DATA USING NOVEL GAUSSIAN FILTER AND ENERGY FUNCTION MINIMIZATION

FIELD OF INVENTION

The present invention relates to a technical field of individual tree crown (ITC) segmentation from airborne light detection and ranging (LiDAR) data.

DESCRIPTION OF RELATED ARTS

Structurally complex forests are a type of woodland in which the arrangement of vegetation is highly varied—the ecosystem includes trees of different sizes, heights, species and ages. The detection and measurement of individual tree crowns in complex forests using remote-sensing data is one of the most important steps in forest resource investigation and management, with implications for the documentation of forest carbon stocks and diversity (Ferraz et al., 2016). Light detection and ranging (LiDAR) has become a mainstream tool for forest surveys, revealing the three-dimensional structures of trees through a high-resolution representation known as a point cloud. Airborne LiDAR, provides a top-down perspective of forests that can be generated over large areas and various terrain conditions (Asner and Mascaro, 2014).

The segmentation of individual tree crowns from point clouds generated via ALS is a considerable challenge (Lindberg and Holmgren, 2017). Existing methods can be classified into two categories. The first focuses directly on the scanned points and retrieves the phenotypic and structural characteristics of tree crowns using computer vision techniques. Features such as the point density (Holmgren and Lindberg, 2019), normal vector of the point cloud (Burt et al., 2019) and spatial distribution of the scanned points (Huang et al., 2019), have been employed to fit tree crown models for complex datasets. Principles applied to optimize forest tree segmentation include the extraction of apex properties from tree segments at various spatial scales to exploit crown geometry features (Vega et al., 2014), the calculation of voxel or super voxel features to guild voxel clustering (Ramiya et al., 2019), the analysis of the verticality of the scanned point distribution from the mid and understory layers to identify trunks beneath potential tree crowns (Mongus and alik, 2015), and the adoption of the local-projection strategy to detect sub-canopy tree crowns in multi-storied forests (Harikumar et al., 2019).

A second set of approaches maps the scanned points into a planar raster in the form of a digital surface model (DSM) or canopy height model (CHM) and combine image processing or the computer vision technique to realize ITC segmentation. A series of related algorithms has been proposed, such as the marker-controlled-watershed algorithm (Hu et al., 2014), mean-shift clustering algorithm (Dai et al., 2018), graph-cut segmentation algorithm (Strîmbu and Strîmbu, 2015), and the tree crown boundary transformation method based on fishing net dragging (Liu et al., 2015). The concepts behind these algorithms mostly originate from computer vision theory (Jain, 2019) and benefit forest measurements by effectively processing the collected scanned data.

Individual tree crown (ITC) segmentation from airborne light detection and ranging (LiDAR) data is a key challenge in forest surveying. Although many ITC segmentation methods have been developed to derive tree crown information from airborne LiDAR data, these algorithms show uncertainty in processing false treetops from foliage clumps and later branches, overlapping areas without clear valley-shape areas, and sub-canopy crowns with neighbouring trees obscuring their shapes.

SUMMARY OF THE PRESENT INVENTION

An object of the present invention is to provide a method of individual tree crown segmentation from airborne LiDAR data using a novel Gaussian filter and energy function minimization, the method can improve the accuracy of tree crown detection and segmentation.

To achieve the above objectives, the present invention adopts the following technical solutions:

A method of individual tree crown segmentation from airborne LiDAR data using a novel Gaussian filter and energy function minimization, comprises the following step of:

1): a DSM was generated from airborne LiDAR data for a forest plot by the rasterization method;
2): DSM filtering is performed based on a dual Gaussian filter;
3): candidate treetops are detected from the filtered DSM using a local-maximum-finding method, and a screening strategy based on an angle threshold is employed to exclude false treetops;
4): the accurate delineation of tree crowns is conducted by a water expansion model controlled by an energy function, along with a estimation of crown width in two perpendicular directions.

As a further improvement to the method of individual tree crown segmentation, wherein the dual Gaussian filter D(c) is as follows:

$$D(c)=C(c)*(G_1(c)+G_2(c)) \quad (1)$$

In equation (1), uniformly distributed and horizontal square grid cells $c \in C$ of size d with the assigned elevation value $c^z$ equal to the highest elevation of all scanned tree points within each cell c cover the scanned forest plot and make up the corresponding DSM $C^z$. $G_1(c)$ and $G_2(c)$ are two Gaussian smoothing filters based on a distance measure and crown shape variability measure, respectively. The square window size s of two Gaussian smoothing filters can be varied and here s is set as the half of the average crown size of the forest plot; These filters are defined as follows:

$$G_1(c_i) = e^{-d|c_j-c_i|^2/2\sigma_d^2} \text{ and } G_2(c_i) = e^{-(c_j^z-c_i^z)^2/2\sigma_g^2},$$

where $c_j$ belongs to the neighbourhood of $c_i$, $d|c_j-c_i| \leq s$ is the distance measure between neighbouring cells $c_j$ and $c_i$, and $(c_j^z-c_i^z)$ uses the height difference measure between the neighbour cell $c_j$ and $c_i$ to depict the variability in the tree crown shape; where $c_j^z$ represents height value of current cell $c_i^z$ c. The magnitudes of the standard deviations $\sigma_d$ and $\sigma_g$ of the two Gaussian smoothing filters are related to the elevation value of the cell $c_i$ on the DSM of the forest plot, i.e., $\sigma_d=a_2 \cdot \sigma_g=a_1 \cdot c_i^z$, where $a_1$ and $a_2$ are the weight coefficients and $a_1 \approx 0.3$ and $a_2 \approx 2$.

As a further improvement to the method of individual tree crown segmentation, the screening strategy based on an angle threshold is as follows:

a included angle θ between the lowest local scanned point and the adjacent candidate treetops on both sides is calculated, which is taken as an index to distinguish the true treetops belonging to each crown and remove false treetops;

when θ≥threshold, the candidate treetops are considered to be formed by later branches or separate foliage clumps belonging to the same tree crown, and one candidate treetop was deleted; when θ<threshold, the canopy heterogeneity produced by different tree crowns creates gaps between trees.

As a further improvement to the method of individual tree crown segmentation, threshold=120°-140°.

As a further improvement to the method of individual tree crown segmentation, the energy function is as follows:

$$E_{h_j}(t_k, d) = \frac{1}{n}\sum_{b=1}^{n}\left\{\frac{\alpha}{Q_b^k} \cdot \sum_{i=1}^{Q_b^k}\left[\arccos\left(\frac{\overrightarrow{t_k c_{i,d}^b} \cdot \nabla c_{i,d}^{b,z}}{|\overrightarrow{t_k c_{i,d}^b}| \cdot |\nabla c_{i,d}^{b,z}|}\right)\right] + \frac{\beta}{3}\sum_{l=1}^{3}\left(\overline{c}_d^{b,z} - t_{c_l^b,l}^z\right)\right\} \quad (2)$$

Before water expansion, the DSM of each forest plot was vertically and evenly stratified into many height interval $h_j$, j=1,2,3 . . . in top-down order based on a fixed spacing. In equation (2), $c_{i,d}^b$ represents the boundary cell of water expansion in the b th triangle of the distance d to the boundary cells of the previous height interval $h_{j-1}$; cells $c_d$, d=1,2,3 . . . together form a concentric contour structure through water expansion with the convergent centre of treetop $t_k$, satisfying the connectivity principle, as shown in FIG. 5f; the $c_{i,d}^{b,z}$ represents the height of the cell $c_{i,d}^b$.

$$\nabla c_{i,d}^{b,z} = \left[\frac{\partial c_{i,d}^{b,z}}{\partial x}, \frac{\partial c_{i,d}^{b,z}}{\partial y}\right]$$

represents the vector of the maximum gradient of the boundary cell $c_{i,d}^b$ on the DSM $C^z$ and $$\overrightarrow{t_k c_{i,d}^b}$$

represents the vector from the corresponding treetop location $t_k$ to the current boundary cell $c_{i,d}^b$.

$$\arccos\left(\frac{\overrightarrow{t_k c_{i,d}^b} \cdot \nabla c_{i,d}^{b,z}}{|\overrightarrow{t_k c_{i,d}^b}| \cdot |\nabla c_{i,d}^{b,z}|}\right)$$

represents the included angle between the gradient vector of boundary cell $c_{i,d}^b$ and the vector from the starting point of water expansion $t_k$ to the current cell $c_{i,d}^b$; The $Q_b^k$ represents the number of current boundary cells $c_{i,d}^b$ in the b th triangle expanded from treetop $t_k$ at distance d;

$$\sum_{l=1}^{3}\left(\overline{c}_d^{b,z} - t_{c_l^b,l}^z\right)$$

represents the height differences between the average height value of all water expanded boundary cells $c_{i,d}^b$ and three surrounding treetops $t_{c_l^b,l}$, the three vertices of the b th triangle; represents the average height value of the boundary cell $c_{i,d}^b$, $t_{c_l^b,l}^z$ represents the height of three surrounding treetops of the boundary cell $c_{i,d}^b$. Here, the coefficient α≈0.1 and $$\beta = \begin{cases} 1 & \text{if } \overline{c}_d^{b,z}]: d = 1, 2, 3 \ldots \\ -1 & \text{otherwise} \end{cases},$$

where $\overline{c}_d^{b,z}]$ denotes the monotonic decrease in the average height value of all expanded boundary cells $c_i^b$ in each height interval with increasing distance d.

The present invention has the following benefits. The invention propose an approach to crown segmentation using computer vision theories applied in different forest types. First, a dual Gaussian filter was designed with automated adaptive parameter assignment and a screening strategy for false treetops. This preserved the geometric characteristics of sub-canopy trees while eliminating false treetops. Second, anisotropic water expansion controlled by the energy function was applied to accurate crown segmentation. This utilized gradient information from the digital surface model and explored the morphological structures of tree crown boundaries as analogous to the maximal valley height difference from surrounding treetops. The applicant of the patent demonstrate the generality of the method using seven diverse plots in the subtropical Gaofeng Forest, China, coupled with ground verification. The approach of this patent enhanced the detection rate of treetops and ITC segmentation relative to the marked-control watershed method, especially in complicated intersections of multiple crowns. A high performance was demonstrated for three pure *Eucalyptus* plots (a treetop detection rate r≥0.95 and crown width estimation $R^2$≥0.90 for dominant and co-dominant trees (DCT); r≥0.83 and $R^2$≥0.88 for suppressed and intermediate trees (SIT)) and three mixed plots dominated by Chinese fir (r≥0.95 and $R^2$≥0.87 for DCT; r≥0.79 and $R^2$≥0.83 for SIT). Finally, in a complex forest park containing a wide range of tree species and sizes, a high performance was also achieved (r=0.93 and $R_2$≥0.87 for DCT; r=0.70 and $R^2$≥0.81 for SIT). Therefore, that methods inspired by the computer vision theory can improve on existing approaches, providing the potential for accurate crown segmentation even in mixed forests with complex structures.

BRIEF DESCRIPTION OF THE DRAWINGS

FIG. 4a is a schematic diagram of a detailed expansion process. FIG. 4b is the corresponding lateral view of tree crown delineation based on the point cloud data using the concept of water pouring. FIG. 4c shows the top view of the corresponding segmentation results.

DETAILED DESCRIPTION OF THE PREFERRED EMBODIMENT

First Embodiment

1. Introduction

Figure 1:
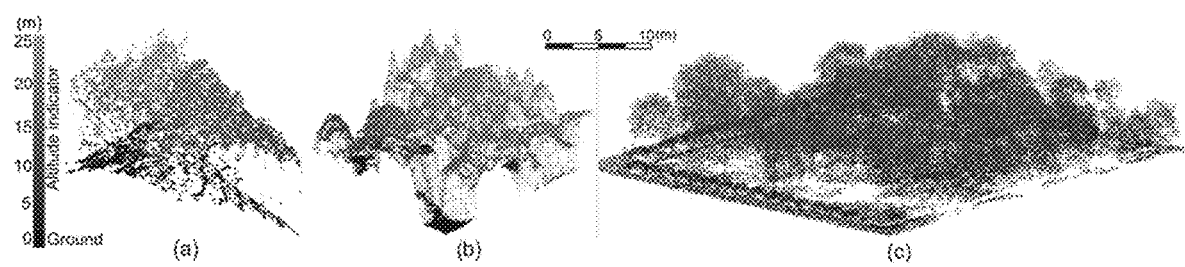
FIG. 1 is a schematic diagram of Airborne LiDAR data from three forest plot types in Gaofeng Forest. (a) One plot of pure *Eucalyptus* stands of varying ages and heights. (b) One plot of Chinese fir mixed with broad-leaved tree species. (c) A subset of a forest park containing tall trees and a shrub layer of sub-canopy stems.

Despite the numerous approaches proposed to detect treetops and segment individual tree crowns from airborne LiDAR data, each method has both benefits and drawbacks, depending on the specific type of forest. Table 1 provides a brief introduction to the existing methods. In general, overlapping crowns and mixed-species forests with irregular crown shapes and topological vagueness complicate crown segmentation (Campbell et al., 2020). Airborne LiDAR provides a top-down scanning perspective and is limited in detection of sub-canopy trees that are always obstructed by upper forest canopy elements. Meanwhile, some more complex algorithms depend on a large number of parameters and need to be locally calibrated for various forest types.

TABLE 1

Brief introduction to existing methods for crown segmentation from airborne LiDAR data. DSM: digital surface model; CHM: canopy height model.

| Category | Typical approaches | Highlights | Drawbacks |
| --- | --- | --- | --- |
| Crown segmentation based on the scanned points | (Vega et al., 2014) | Defining the criteria of apex selection from the scanned points based on the elevation value and using a distance threshold to guide crown segmentation. | Relatively poor performance on broad leaved trees due to the higher geometrical complexity of tree crowns with more apices in the crown periphery. |
| | (Ramiya et al., 2019) | Subdivision strategy for the scanned points using the super voxel concept and geometrical feature-driven voxel merging and clustering for crown segmentation. | Uncertainty exists for the classification algorithm in differentiating canopies of different forest types. |
| | (Mongus and Žalik, 2015) | Analysing the verticality of the scanned point distribution to locate tree trunks, which are taken as the markers, coupled with density-based clustering for crown segmentation. | The low laser beam penetration rate caused by occlusion from upper vegetative elements results in weak trunk detection. |
| | (Harikumar et al., 2019) | A local horizontal projection-based approach designed to optimize the perspective view of the scanned points and find sub-canopy tree crowns. | Time-consuming for larger forest areas, and the performance is impaired by low point cloud densities. |
| Crown segmentation based on the | (Hu et al., 2014); | Marker-controlled watershed method combined with semi-variogram statistics for tree size | Locally protruding branches cause over segmentation, and lower accuracies occur for deciduous |

TABLE 1-continued

Brief introduction to existing methods for crown segmentation from airborne
LiDAR data. DSM: digital surface model; CHM: canopy height model.

| Category | Typical approaches | Highlights | Drawbacks |
|---|---|---|---|
| DSM or CHM | | determination and crown segmentation based on CHM. | forests with closed canopies. |
| | (Dai et al., 2018) | Mean shift segmentation based on the joint feature space of scanned points combined with a semi-supervised classification algorithm. | Depending on the number of training samples, failures arise for clustered trees and complex forest architectures. |
| | (Strîmbu and Strîmbu, 2015) | Retrieval of the topological structure of forests in hierarchical data structures and construction of a weighted partitioning graph for crown segmentation. | Parameter settings are important for algorithm performance, and further constraints are needed to avoid over- and under- segmentation. |
| | (Liu et al., 2015) | Refinement of the initial tree crown boundaries generated by the watershed method using the concept of fishing net dragging driven by the height differences between adjacent pixels. | The segmentation accuracy decreases when the gaps between trees do not present marked valley shapes. There is limited detection of small sub-canopy trees. |

Computer vision is an interdisciplinary scientific field that uses computer theory to gain a high-level understanding of digital images and establish the correlations between 2D images and 3D real-world scenarios (Jain, 2019). Forest canopy information can be presented in 2D forms, such as a DSM or CHM, or as 3D point clouds. Computer vision techniques train machines to extract features from these representations and afford interpretations of forest scenes from the identified phonotypical differences among trees for implementing individual crown segmentation at varying scales. Energy minimization (Kichenassamy et al., 1995; Liu et al., 2015) is an elegant approach to computer vision problems that have many potential solutions due to uncertainties in the imaging process and ambiguities in visual interpretation. The energy function encodes the problem constraints and seeks its minimum to provide the optimal solution. The concept of energy minimization has been successfully applied in many computer vision applications, such as active contour models for medical image segmentation (Qian et al., 2013), stereo matching from 2D images to 3D scenario reconstruction (Mozerov and van de Weijer, 2015) and multi-target detection from multispectral or hyperspectral imageries (Zhu et al., 2020). Tree crown segmentation can be converted into the problem of object segmentation or target detection, and energy minimization has an inherent ability for such applications that can be taken into consideration.

Here, we propose a novel method based on the computer vision theory for accurate tree crown segmentation for a variety of tree species and site conditions, as demonstrated using airborne LiDAR scans of complex forests paired with field validation data. First, we introduce a new approach to identifying treetops based on a dual Gaussian filter with a screening strategy based on the angle threshold for excluding false treetops detected within the DSM. Second, tree crown segmentation proceeds based on the water expansion concept and an energy control function constituting two items: the gradient information of the DSM and height differences between adjacent treetops and the expansion cells. Finally, our proposed method was applied to three forest plot types, with obtained field measurements used as references to validate the efficacy of our approach. Through this work, we demonstrate an enhancement of the accuracy of tree crown detection and segmentation relative to existing approaches.

2. Materials and Methods 2.1. Study Area

Gaofeng Forest is a forest plantation in the Guangxi Province of southern China, covering an area from 108°7' to 108°38' E and 22°49' to 23°5' N. It has a humid subtropical monsoon climate with an average annual temperature of 21.6° C., annual precipitation of 1304 mm, and elevations from 78-468 m above sea level. The study area covers 52 km$^2$. Its topography is composed of gradients from 0-47°. There are many typical forest plot types, e.g., pure *Eucalyptus* (*Eucalyptus robusta* Sm.) forest, Chinese fir (*Cunninghamia lanceolata* Hook.) dominated forests and forest park landscapes. Forests dominated by Chinese fir include many broad-leaved tree species, including cinnamon (*Cinnamomum cassia* (L.) J.Presl), star anise (*Illicium verum* Hook.f.), *Robinia pseudoacacia* L., *Ulmus pumila* L. and *Osmanthus fragrans* Lour, forming a lush forest. Forest parks contain a broad mixture of tree species with different crown sizes. They retain small numbers of old trees, e.g., Chinese *banyan* (*Ficus microcarpa* Blume) and *camphora* (*Cinnamomum camphora* (Linn.) J.Presl) with larger and higher tree crowns, and many tree saplings including *Bauhinia* spp, *Thevetia peruviana* (Pers.) K.Schum and *Cassia nodosa* Buch.-Ham. ex Boxb, with small plant spacing and some well-pruned small trees of *Loropetalum* spp planted at the edge of the plot to form a hedge.

Plantations of *Eucalyptus* and Chinese fir are grown on unevenly hilly terrain with variations in radiance absorption, wind exposure, plant transpiration and reforestation activities, which result in non-uniform growth and stochastic mortality of the trees. Therefore, the two forest types, i.e., pure *Eucalyptus* and Chinese fir dominated plots, have small populations (roughly 15-30%) of suppressed and intermediate trees (SIT) (i.e., trees with narrow or one-sided crowns below the general level of the forest canopy and unable to receive direct light from the sides due to obscuration by surrounding trees), which are composed of regenerating trees grown in the forest gaps with limited growth space and a few trees with low vigour in competition. Meanwhile, 70-85% of the trees are dominant and co-dominant trees (DCT) (i.e., trees with full crowns above or equal to the general level of the forest canopy and able to receive direct lights from the sides) that make up the overstory composition. For the third type of forest park at the foot of the mountain, there are diverse forest stands and plants at various growth stages under landscape management, constituting a rich vertical structure and beautiful forest sceneries, where approximately 10-20% of the trees are SIT.

2.2. LiDAR Data and Field Data

LiDAR data for the study plots were obtained on Feb. 20, 2018 using a Velodyne HDL-32E laser scanner flown at 70 m above the take-off location level, with a flight speed of 20 km/h and a flight line side-lap of 30%. The scanner emits a wavelength of 903 nm at a 21.7 kHz pulse repetition frequency with a vertical field of view (FOV) of −30.67°~10.67° from nadir and a horizontal FOV of 360'. The beam divergence was approximately 2 mrad, with an average footprint diameter of 12 cm. The average ground point distance was 10 cm, with a pulse density of approximately 120 points per m². The positional accuracy of this LiDAR dataset was measured by GPS check points and yielded an average deviation within 3 cm. FIG. 1 shows part of the collected Airborne LiDAR data of three forest types in our study area.

The field data were measured in February 2018. Seven sampling plots were established in the region for data acquisition, comprising three pure *Eucalyptus* stands of varying ages and heights grown on the mountain slope with a plot size of 20×20 m (FIG. 1a). Three plantations of Chinese fir with a plot size of 20×20 m that included other broad-leaf tree species constituted the multi-storied forests (FIG. 1b). The 7$^{th}$ plot was a subset of a forest park at the foot of a mountain with a size of 136×84 m at that was composed of many landscape trees and plants, as mentioned in section 2.1, and the stratified forest structure is shown in FIG. 1c.

See FIG. 1. Airborne LiDAR data from three forest plot types in Gaofeng Forest. (a) One plot of pure *Eucalyptus* stands of varying ages and heights. (b) One plot of Chinese fir mixed with broad-leaved tree species. (c) A subset of a forest park containing tall trees and a shrub layer of sub-canopy stems.

The positions of the four corners and the centre of each plot were determined using a Trimble R4 GNSS receiver, repeatedly corrected with high precision real time differential signals received from the Trimble NetR9 GNSS reference receiver, which was located in an open space near the studied forest plot at a distance of less than 1 km (Shen et al., 2019). The China brand Hi-Target Zts-121r4 total station was located at a known point in the corresponding plot, and another known point was used for orientation, which facilitated determining the position of each tree trunk in every plot, resulting in a measurement accuracy of ±10 cm. Tree heights were measured using a Vertex V hypsometer (Haglöf, Långsele, Sweden). Crown widths were obtained by two perpendicular measurements from the location of each tree trunk in the east-west and north-south directions. The leaf area index (LAI) of the pure *Eucalyptus* plots and Chinese fir-dominated plots were indirectly measured using the LAI-2000 equipment and cameras with hemispherical lenses (Yun et al., 2016).

2.3. Data Processing

Figure 2:
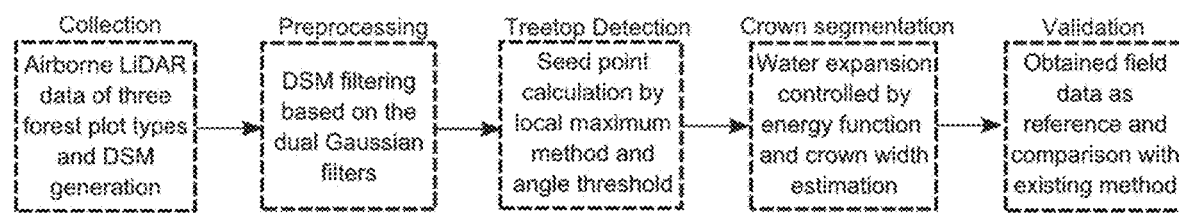
FIG. 2 is a flowchart illustrating the main steps of the individual tree crown segmentation method.

An overview of the workflow is shown in FIG. 2. First, a DSM was generated from airborne LiDAR data for each of the three forest plot types by the rasterization method. Next, DSM filtering was performed based on the dual Gaussian filter. Candidate treetops were then detected from the filtered DSM using the local-maximum-finding method, and a screening strategy based on the angle threshold was employed to exclude false treetops. Then, the accurate delineation of tree crowns was conducted by a water expansion model controlled by the energy function, along with the estimation of crown width in two perpendicular directions. Finally, the performance of our method was compared with those of existing methods and verified by the field data. All steps of scanned data processing for the purpose of ITC segmentation were implemented in MATLAB (The Math Works, Inc. Natick, Massachusetts, U.S.A.), and the code can be requested from the first and second authors.

See FIG. 2. Flowchart illustrating the main steps of our individual tree crown segmentation method.

2.4. DSM Generation

It is difficult to obtain an accurate digital terrain model (DTM) from airborne LiDAR in dense forests due to the poor penetration of laser beams through the forest canopy. This makes prone to deviations in the derived CHM. Instead, we used the DSM as the basic data set for our tree crown delineation algorithm. Point clouds were first processed to remove noise and outliers (Xu et al., 2018). The data were then classified as ground points and aboveground points (scanned tree points) using a progressive morphological filter (Zhang et al., 2016). Uniformly distributed and horizontal square grid cells $c \in C$ of size d with the assigned elevation value $c_i^z$ equal to the highest elevation of all scanned tree points within each cell $c_i$ cover the scanned forest plot and make up the corresponding DSM $C^z$ (Khosravipour et al., 2014), where i represents the i th grid cell belonging to the DSM $C^z$. Usually, the local density of collected forest point clouds varies with the incident angle of the laser beam, the inclination angles of vegetative elements and the degree of occlusion by obstructing objects (Yun et al., 2019). Based on an estimated average ground point spacing across the seven sampling forest plots of 10 cm, we set the size d of the square grid cell to 18 cm. This means that an average cell contained at least 4 points within the cell, representing a suitable trade-off between avoiding empty cells and preserving sufficient details to characterise the forest canopy.

2.5. Tree Top Detection

Automated methods for identifying tree tops can cause errors in two directions. Large broad-leaved and needle-leaved tree crowns with the outermost wild-grown branches attached are often misinterpreted as a group of treetops, which is prone to generate commission errors. On the other hand, groups of small trees can be incorrectly classified as a single tree, creating omission errors. An appropriate filtering solution need to synthetically consider many morphological factors, such as the tree crown size, shape and height; therefore, it is important to enforce both phenotypic and biological properties of the tree crown in the filtering process to facilitate treetop location. We therefore designed a dual Gaussian filter based on tree height differences and crown shape attributes. This acts to smooth the DSM as follows:

$$D(c)=C(c)*(G_1(c)+G_2(c)) \quad (1)$$

In equation (1), $G_1$ and $G_2$ are two Gaussian smoothing filters with an s by s window size based on the distance measure and crown shape variability measure, respectively. These filters are defined as follows:

$$G_1(c_i) = e^{-d|c_j-c_i|^2/2\sigma_d^2} \text{ and } G_2(c_i) = e^{-(c_j^z-c_i^z)^2/2\sigma_g^2},$$

where $c_j$ belongs to the neighbourhood of $c_i$, $d|c_j-c_i| \le s$ is the distance measure between neighbouring cells $c_j$ and $c_i$, and $(c_j^z-c_i^z)$ uses the height difference measure between the neighbour cell $c_j$ and $c_i$ to depict the variability in the tree crown shape. The square window size s of two Gaussian smoothing filters can be varied and here s is set as the half of the average crown size of the studied plot. The magnitudes of the standard deviations $\sigma_d$ and $\sigma_g$ of the two Gaussian smoothing filters are related to the elevation value of the cell $c_i$ on the DSM of the forest plot, i.e., $\sigma_d = a_2 \cdot \sigma_g = a_1 \cdot c_i^z$, where $a_1$ and $a_2$ are the weight coefficients.

Figure 3:
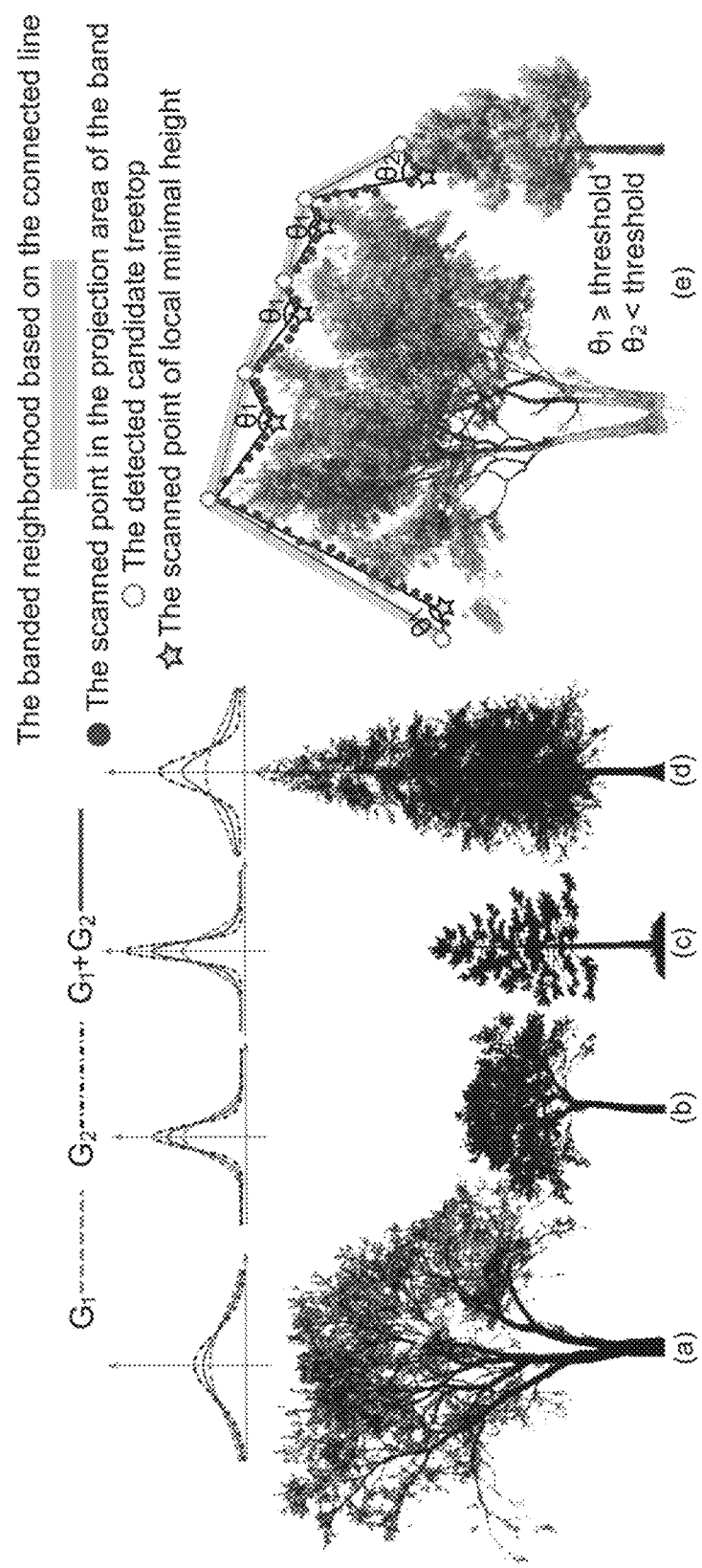
FIG. 3 is a schematic diagram of filtering process for a variety of tree crowns. (a)-(d) A combination of two Gaussian filters is applied to smooth the airborne LiDAR data of a variety of tree crowns, with filter $G_1$ based on the distance and $G_2$ based on the height differences between the adjacent cells of the tree crowns to incorporate variability in crown shapes. (e) The included angle θ between the lowest local scanned point and the adjacent candidate treetops on both sides is calculated.

FIG. 3 demonstrates the basic concept of our filtering process for a variety of tree crowns. Taller trees usually have broader crowns (FIGS. 3a and d). As the standard deviation $\sigma_d$ of filter $G_1$ is positively related to the tree height, filter $G_1$ strengthens the smoothing effect for taller trees and weakens the smoothing effect for smaller or suppressed trees to preserve inconspicuous features of partially blocked crowns (FIG. 3b). For trees with slender crowns, e.g., *Cedrus deodara* (Roxb.) G. Don and *Metasequoia glyptostroboides* Hu and W. C. Cheng, the smoothing efficiency of filter $G_2$ will weaken due to an increase in the height differences between adjacent cells of the tree crown, which preserves the phenotypic characteristics and optimizes treetop detection for small trees (FIGS. 3c and d). The combination of the two filters, $G_1$ and $G_2$, is therefore suitable for the DSM of tree crowns with various properties.

See FIG. 3. (a)-(d) A combination of two Gaussian filters is applied to smooth the airborne LiDAR data of a variety of tree crowns, with filter $G_1$ based on the distance and $G_2$ based on the height differences between the adjacent cells of the tree crowns to incorporate variability in crown shapes. The values of the standard deviation c of the two filters also adaptively vary with the target tree height. The combination of the two filters strengthens the smoothing effect for larger tree crowns and preserves hidden features of small trees. (e) The included angle θ between the lowest local scanned point (Pentagram with black boundary) and the adjacent candidate treetops (pale white circle) on both sides is calculated, which is taken as an index to distinguish the true treetops belonging to each crown and remove false treetops arising from lateral branches or foliage clumps within the same tree.

The potential locations of candidate treetops were next identified using a local-maximum-finding algorithm (Faraji et al., 2015). A further strategy for selecting true treetops from the candidate treetops was proposed for trees with multiple trunks or strong lateral branches forming distinct foliage clumps. These can generate local height maxima and produce false treetops which impair the detection accuracy. To overcome this problem, a banded neighbourhood was generated with an assigned width based on the lines between two adjacent candidate treetops (orange bands shown in FIG. 3e). The lowest scanned point in the corresponding vertical projection area of each banded neighbourhood on the DSM was combined with the two endpoints (candidate treetops) of each line to generate an angle θ. Any single tree typically has a relatively smooth crown shape to increase light exposure and maintain balanced growth to preserve the mechanical stability of the tree body. Hence, when θ≥threshold, the two endpoints (candidate treetops labelled by pale white circles) of each line were considered to be formed by later branches or separate foliage clumps belonging to the same tree crown, and one candidate treetop (pale white circle) was deleted. Otherwise, the canopy heterogeneity produced by different tree crowns creates gaps between trees, leading to a smaller θ<threshold, as shown in FIG. 3e.

After this processing, the filtered treetops were taken as seed points for our water expansion algorithm to realize tree crown segmentation.

2.6. Water Expansion Concept and Energy Function Control 2.6.1. Water Expansion Concept for Segmentation The pouring water simulation algorithm was used to extract the spatial boundaries of individual tree crowns from the DSM (Duncanson et al., 2014). This is based on the concept of pouring water into pits, which are represented by inverse tree crown profiles, and controlling the water flowing into each pit according to the tree heights. The schematic representation in FIG. 4a shows the detailed expansion process. The inverse DSM of each forest plot was vertically and evenly stratified into 5 layers based on the height interval (3.5 m here) and the water was first poured into the lowest layer until it was completely filled. Then the water spreads into the adjacent layer (upper layer) as the water level increases. The process of pouring water continued in this way until the highest layer of each pit was filled with water. The corresponding lateral view of tree crown delineation based on the point cloud data using the concept of water pouring is shown in FIG. 4b. Water first pours into the upper parts of the forest canopy, i.e., the lower layers of the pits, where few overlapping portions between tree crowns exist. Tree crown profiles in this region can be clearly delineated through depicting the edge of the water in each pit. During the water-pouring process, the upper tree crown profile information can be used to guide the segmentation of tree crown parts in the lower layers with intersecting regions between the tree crowns. FIG. 4c shows the top view of the corresponding segmentation results. All points within the expanded boundaries are assigned to the respective canopies.

Figure 4:
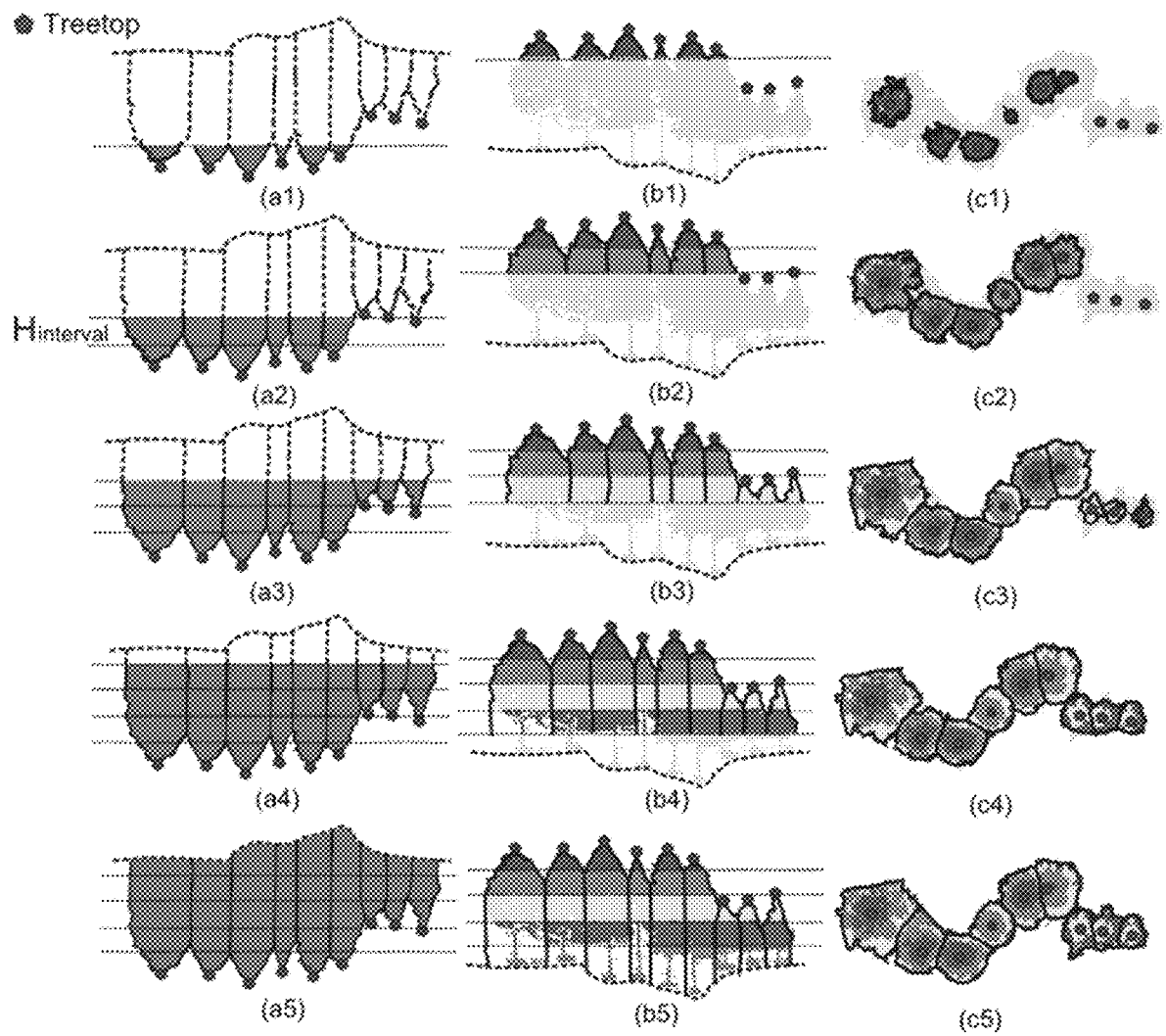
FIG. 4 is a schematic diagram illustrating the water expansion on the digital surface model for tree crown segmentation. (a) An inverted forest profile represents the concept of water pouring into each tree crown profile. (b) Equivalent figure to (a), showing that water expansion acts in each height interval in top-down order. Non-segmented scanned points are represented by the light green colour, and the segmented scanned points are coloured identically. (c) Equivalent figure to (b) from the top-down view, showing the tree boundary delineation using the watershed method.

See FIG. 4. Schematic representation illustrating the water expansion on the digital surface model for tree crown segmentation. (a) An inverted forest profile represents the concept of water pouring into each tree crown profile. (b) Equivalent figure to (a), showing that water expansion acts in each height interval in top-down order. Non-segmented scanned points are represented by the light grey colour, and the segmented scanned points are represented by different grey colours. (c) Equivalent figure to (b) from the top-down view, showing the tree boundary delineation using the watershed method.

2.6.2. Energy Function for the Control of Water Expansion

Water expansion in each tree crown usually occurs in a random order at the same height interval. This stochasticity may result in incorrect results, especially when neighbouring trees have intersecting tree crowns within the same height intervals. The absence of clear boundaries and distinct geometric features in the overlapping areas of tree crowns renders precise tree crown segmentation infeasible. Here we propose a method for minimizing such errors.

Tree crown surfaces usually exhibit a downward trend from the treetop to the surrounding areas which continues until the edge of the crown. This suggests three properties that can be used to accurately identify crown boundaries. (1) For any given tree crown cell on the DSM (FIG. 5a), the gradient vector aligns well with the steepest descent direction from the real treetop to the current cell (FIGS. 5b and c). (2) Tree boundaries can be defined as the valley areas (i.e., elongated depressions or low-lying areas) on the DSM between tree crowns, where maximum height differences with the surrounding treetops occur (FIG. 5d). (3) Tree crowns form irregular shapes in the horizontal profile. Hence, anisotropic water expansion from the treetop location in each height interval is necessary for accurate tree crown separation.

Figure 5:
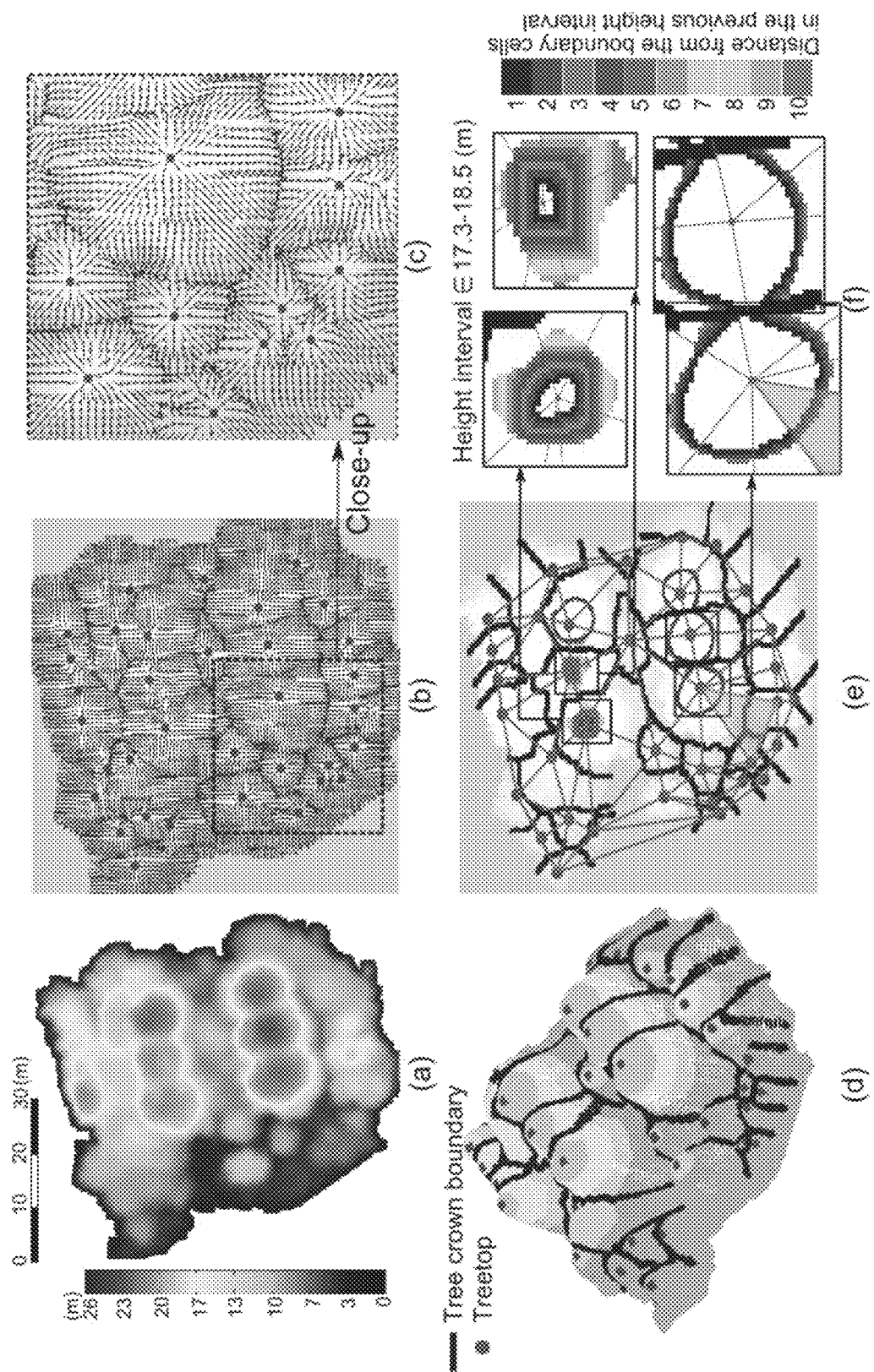
FIG. 5 is a schematic diagram illustrating the watershed method controlled by the energy function. (a) DSM generated from airborne LiDAR data after initial filtering. (b) Gradient vector of each DSM cell, which has an approximate direction coincident with the vector from its real treetop to the current cell. (c) Magnification of the black square in (b). (d) The true crown boundaries marked in dark colour, which are located in the valley areas of the DSM and have the maximal heights differences relative to the surrounding treetops. (e) Taking all treetops as the vertices, Delaunay triangulation was performed to refine water expansion control in different triangles, which is beneficial for depicting the anisotropic shapes of tree crowns. (f) Magnification of the four black squares in (e), in which the nested contours of different types of grey colours show synchronous water expansion at the cell scale.

See FIG. 5. Schematic diagram illustrating the watershed method controlled by the energy function. (a) DSM generated from airborne LiDAR data after initial filtering. (b) Gradient vector of each DSM cell, which has an approximate direction coincident with the vector from its real treetop to the current cell. (c) Magnification of the black square in (b). (d) The true crown boundaries marked in dark colour, which are located in the valley areas of the DSM and have the maximal heights differences relative to the surrounding treetops. (e) Taking all treetops as the vertices, Delaunay triangulation was performed to refine water expansion control in different triangles, which is beneficial for depicting the anisotropic shapes of tree crowns. (f) Magnification of the four black squares in (e), in which the nested contours of different types of grey colours show synchronous water expansion at the cell scale.

Based on these three principles, we constructed a Delaunay triangulation of the DSM using the detected treetops as the triangle vertices. This vertically subdivides the water expansion for each tree crown into different sections, accounting for its irregular shape (FIG. 5e). The retrieval of the height differences between the boundary cells of water expansion and the adjacent treetops reasonably transforms into seeking the height differences between the boundary cells and the three vertices of the triangle in which the boundary cells are located (an example is shown in FIG. 5e). Thus, an energy function based on the gradient information of the DSM and the height differences was proposed to control the water expansion in each height interval for every tree crown:

$$E_{h_j}(t_k, d) = \frac{1}{n}\sum_{b=1}^{n}\left\{\frac{\alpha}{Q_b^k} \cdot \sum_{i=1}^{Q_b^k}\left[\arccos\left(\frac{\overrightarrow{t_k c_{i,d}^b} \cdot \nabla c_{i,d}^{b,z}}{|\overrightarrow{t_k c_{i,d}^b}| \cdot |\nabla c_{i,d}^{b,z}|}\right)\right] + \frac{\beta}{3}\sum_{i=1}^{3}\left(\bar{c}_d^{b,z} - t_{c_i^b,i}^z\right)\right\} \quad (2)$$

The DSM of each forest plot was vertically and evenly stratified into many height interval $h_j$, $j=1,2,3$ . . . in top-down order based on a fixed spacing. In equation (2), $c_{i,d}^b$ represents the boundary cell of water expansion in the b th triangle of the distance d to the boundary cells of the previous height interval $h_{j-1}$. Cells $c_d$, $d=1,2,3$ . . . together form a concentric contour structure through water expansion with the convergent centre of treetop $t_k$, satisfying the connectivity principle, as shown in FIG. 5f. $c_{i,d}^{b,z}$ represents the height of the cell $c_{i,d}^b$.

$$\nabla c_{i,d}^{b,z} = \left[\frac{\partial c_{i,d}^{b,z}}{\partial x}, \frac{\partial c_{i,d}^{b,z}}{\partial y}\right]$$

represents the vector of the maximum gradient of the boundary cell $c_{i,d}^b$ on the DSM $C^z$ and $$\overrightarrow{t_k c_{i,d}^b}$$

represents the vector from the corresponding treetop location $t_k$ to the current boundary cell $c_{i,d}^b$.

$$\arccos\left(\frac{\overrightarrow{t_k c_{i,d}^b} \cdot \nabla c_{i,d}^{b,z}}{|\overrightarrow{t_k c_{i,d}^b}| \cdot |\nabla c_{i,d}^{b,z}|}\right)$$

represents the included angle between the gradient vector of boundary cell $c_{i,d}^b$ and the vector from the starting point of water expansion $t_k$ to the current cell $c_{i,d}^b$. $Q_b^k$ represents the number of current boundary cells $c_{i,d}^b$ in the b th triangle expanded from treetop $t_k$ at distance d.

$$\sum_{i=1}^{3}\left(\bar{c}_d^{b,z} - t_{c_i^b,i}^z\right)$$

represents the height differences between the average height value of all water expanded boundary cells $c_{i,d}^b$ and three surrounding treetops $t_{c_i^b,i}$, i.e., the three vertices of the b th triangle; $\bar{c}_d^{b,z}$ represents the average height value of $c_{i,d}^b$, $t_{c_i^b,i}^z$ represents the height of three surrounding treetops of $c_{i,d}^b$. Here, the coefficient $\alpha \approx 0.1$ and $$\beta = \begin{cases} 1 & \text{if } \bar{c}_d^{b,z}]: d = 1, 2, 3 \ldots \\ -1 & \text{otherwise} \end{cases},$$

where $\bar{c}_d^{b,z}]$ denotes the monotonic decrease in the average height value of all expanded boundary cells $c_i^b$ in each height interval with increasing distance d.

The gradient vector of each cell as filled through water expansion should be roughly equal to the direction of the vector from the cell to its true treetop, i.e., the included angle between the two vectors should be minimised. Meanwhile, the closer the water gets to the tree boundary, the larger the height differences between the boundary cells and the three adjacent treetops. Hence, the value of equation (2) should maintain a downward trend as distance d increases or the water expansion continues until reaching a minimum value. If an exception occurs and the downward trend is broken, areas generated by incorrect water expansion in the current height interval or distance need to be adjusted such that the order of water expansion for the corresponding tree crowns redistributes correctly among overlapping tree crown areas.

Figure 6:
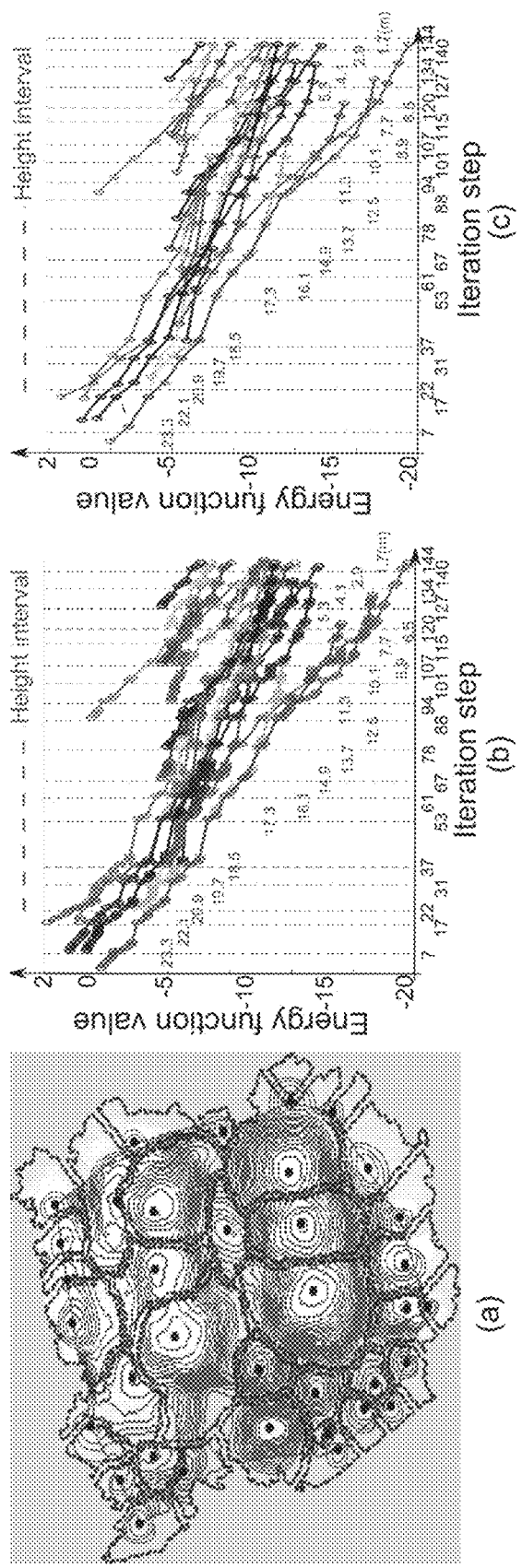
FIG. 6 is a schematic diagram of process of the water expansion algorithm within each tree crown as controlled by the energy function.

The specific energy function values for each tree crown in the target forest plot illustrated in FIG. 5 are shown in FIG. 6. FIG. 6a shows that the contours, i.e., the boundaries of water expansion in each height interval on the DSM, are similar to the structure of the nested hierarchical relationship. The blue lines were deliberately drawn to optimise display of the segmented crowns. The energy function values versus the iteration step of the algorithm are shown in FIG. 6b, where the red lines mark the position of the height interval corresponding to the red contours in FIG. 6a and the small coloured circle in each height interval in FIG. 6b represents the detailed calculated energy function of each concentric contour structure with Increased distance d to the boundary of the previous height interval (as the different coloured contours show in FIG. 5f). FIG. 6c is a simplified version of FIG. 6b and uses one small circle to represent the calculated average energy function value of each height interval for every tree crown. The downward trend of the energy function value represents the ability of our method to adaptively control water expansion within each tree crown.

See FIG. 6. Process of the water expansion algorithm within each tree crown as controlled by the energy function. (a) grey contour lines depict the boundaries of water expansion at each height interval, and dash-dotted lines represent the final model fit. (b) Values of the energy function for each tree crown with the steps of water expansion. Each line in different grey colours represents the calculated energy function value of a single tree; the vertical dashed lines mark the position of each height interval (as contours in (a)) and circles of different grey colours represent the calculated values of the energy function for the water expanded boundary cells with increasing distance d. (c) is equivalent to (b) with an abbreviated representation using fewer circles of different grey colours to represent the average value of the energy function in each height interval for every tree crown.

2.7. Proposed Model Accuracy Assessment

The accuracy of the identification of treetops from airborne LiDAR was assessed against the field measurements using the following equations.

$$r = TP/(TP+FN) \quad (4)$$

$$p = TP/(TP+FP) \quad (5)$$

$$f = 2 \times (r \times p)/(r+p) \quad (6)$$

Here, r (recall) is the tree detection rate, p (precision) is the correctness of the detected trees, f is the overall accuracy of the detected trees, TP (true positive) is the number of correctly detected trees, FN (false negative) is the number of trees that were not detected (omission error), and FP (false positive) is the number of extra trees that did not exist in the field (commission error).

Measures of tree crown widths in the north-south and east-west directions obtained from our method were compared with field measurements. The accuracy of the estimated tree crown width was assessed by linear regression and evaluated using R-squared, the root mean squared error (RMSE) and the relative RMSE (defined as the percentage of the ratio of the RMSE to the observed mean values).

The algorithm performance comparison may be difficult to obtain if various methods are applied on different forest conditions. The marked-control watershed method (MCW) (Duncanson et al., 2014) (Wan Mohd Jaafar et al., 2018) is a typical algorithm that has been applied in a variety of forest types. Hence, a comparative analysis between the MCW and our approach was conducted on the three plots of different forest types.

3. Results

3.1. Treetop Detection

Figure 7:
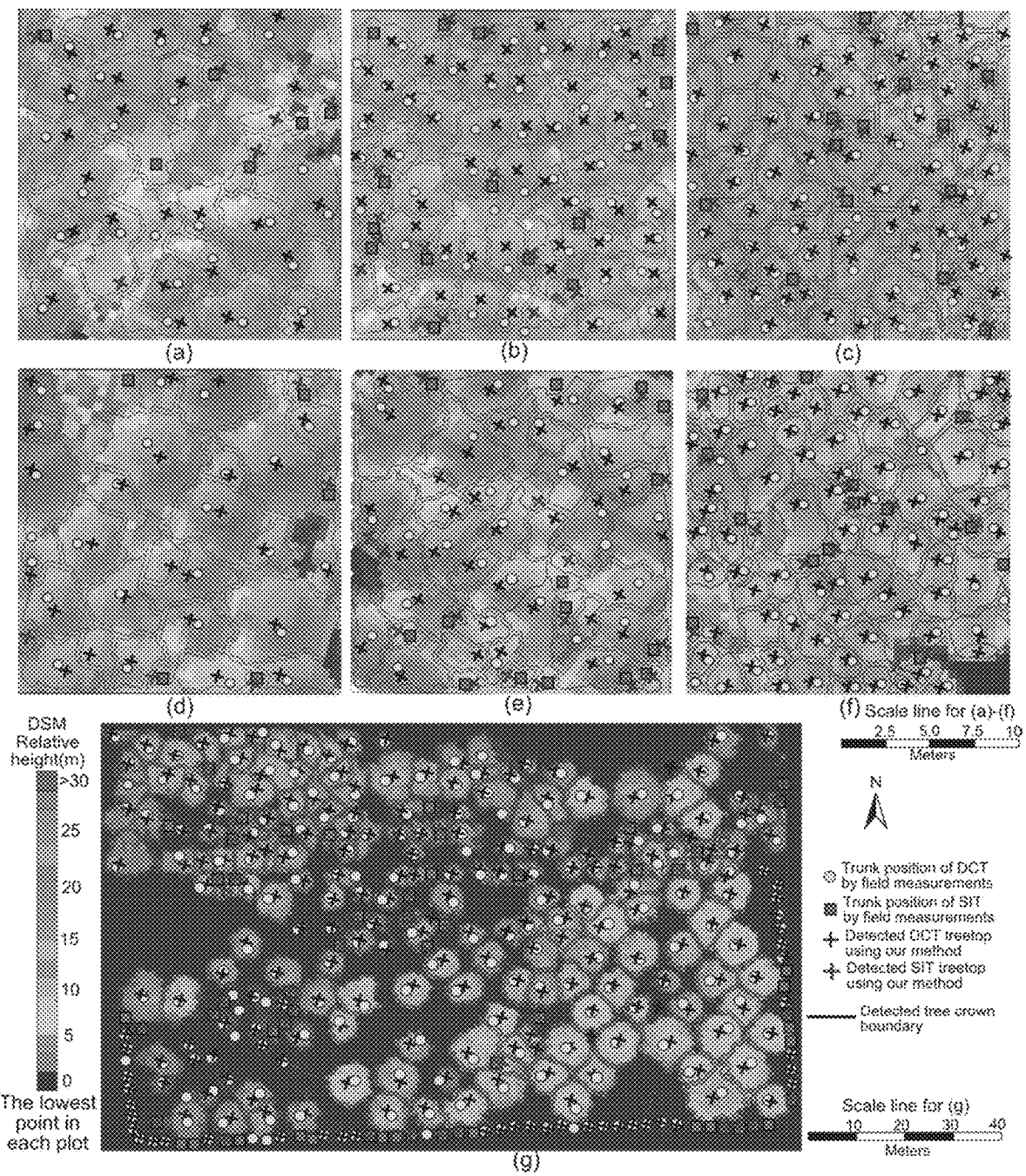
FIG. 7 is a schematic diagram of treetop detection and crown segmentation for seven selected forest plots. (a)-(c) Three pure *Eucalyptus* plots and (d)-(f) three Chinese fir dominated plots are arranged by increasing stem densities, respectively. (g) shows a portion of the forest park.

The DSM of 3 equal-sized *Eucalyptus* plots (FIGS. 7a, b and c) and 3 Chinese fir plots (FIGS. 7d, e and f) were arranged in ascending order of stem density with decreasing tree height, respectively. The specific growth properties of forest stands in these plots are shown in Table 2, where the percentage of different tree classes, i.e., dominant and co-dominant trees (DCT) and suppressed and intermediate trees (SIT), the stem densities and the range of tree heights are provided for each plot. In FIG. 7, different colours represent the heights relative to the plot ground. Inevitable deviation in the positions between the manually measured trunks and treetops detected by our method occurs because tree trunks can be inclined and small GPS errors and LiDAR data positional errors exist. If the horizontal distance between the detected treetops and surrounding trunk locations were larger than half the average tree crown width within the plot, the treetops detected using our method were judged invalid. As seen from FIG. 7, most of the DCT and SIT treetops were detected by our method.

See FIG. 7. Treetop detection and crown segmentation for seven selected forest plots. Black lines depict the boundaries of the tree crowns detected using our method. Crosses represent the locations of treetops detected using our method; black: dominant or co-dominant trees (DCT); grey: suppressed or intermediate trees (SIT). Circles and squares represent field-mapped trunk locations (Circle: DCT, square: SIT). It is reasonable that positional deviation exists between the two kinds of marks for each tree as tree trunks maybe skewed, or the highest points of trees can be generated by an angled strong branch. (a)-(c) Three pure *Eucalyptus* plots and (d)-(f) three Chinese fir dominated plots are arranged by increasing stem densities, respectively. (g) shows a portion of the forest park.

The rates of treetop detection are shown in Table 2. For the six *Eucalyptus* and Chinese fir plots (a, b, c, d, e and f), the treetop detection rate r of DCT (0.95-0.97) was higher than that of SIT (0.79-0.88). The treetop detection rates r of DCT were similar for *Eucalyptus* (0.95-0.96) and Chinese fir (0.95-0.97). *Eucalyptus* trees in plot a, b and c having simple structures make it easier to detect SIT with r=0.83-0.88 relative to the structures of the more mixed and structurally complex Chinese fir plots (d, e and f) with r=0.79-0.80. Meanwhile, the correctness of the detected treetops p for the DCT (0.91-0.93) and SIT (0.75-0.84) in the three Chinese fir plots was lower than that for the DCT (0.92-0.95) and SIT (0.83-0.88) in three *Eucalyptus* plots, respectively. For the 7th plot of the forest park, Table 2 shows a relatively high treetop detection rate r of 0.93 and a correctness of the detected treetops p of 0.94 for DCT. On the other hand, r fell to 0.70 and p=0.82 for SIT. These values are lower than those for the *Eucalyptus* and Chinese fir plots (a-f).

TABLE 2

The accuracy assessments for treetop detection in the 7 test forest plots.

| | Plot | 1 a | 2 b | 3 c | 4 d | 5 e | 6 f | 7 g |
|---|---|---|---|---|---|---|---|---|
| | Density (tree/m$^2$); | 0.08 | 0.17 | 0.20 | 0.08 | 0.12 | 0.22 | 0.03 |
| | SIT/(DCT + SIT) | 19.4% | 23.9% | 17.5% | 16.7% | 32.6% | 15.7% | 20.7% |
| DCT | Number of trees | 25 | 51 | 66 | 25 | 31 | 75 | 237 |
| | Tree height range (m) | 18.2-31.7 | 14.7-26.7 | 14.0-22.5 | 14.5-26.4 | 11.7-22.8 | 12.1-19.6 | 1.3-15.1 |
| | NDT | 26 | 52 | 66 | 26 | 34 | 76 | 234 |
| | TP | 24 | 49 | 63 | 24 | 31 | 71 | 221 |
| | FP | 2 | 3 | 3 | 2 | 3 | 5 | 13 |
| | FN | 1 | 2 | 3 | 1 | 1 | 4 | 16 |
| | r | 0.96 | 0.96 | 0.95 | 0.96 | 0.97 | 0.95 | 0.93 |
| | p | 0.92 | 0.94 | 0.95 | 0.92 | 0.91 | 0.93 | 0.94 |
| | f | 0.94 | 0.95 | 0.95 | 0.94 | 0.94 | 0.94 | 0.93 |
| SIT | Number of trees | 6 | 16 | 14 | 5 | 15 | 14 | 62 |
| | Tree height range (m) | 12.6-22.5 | 13.1-19.7 | 8.7-14.1 | 7.6-15.3 | 8.1-14.7 | 8.7-12.4 | 1.3-7.6 |
| | NDT | 6 | 16 | 14 | 5 | 16 | 13 | 52 |

TABLE 2-continued

The accuracy assessments for treetop detection in the 7 test forest plots.

| Plot | 1 a | 2 b | 3 c | 4 d | 5 e | 6 f | 7 g |
|------|-----|-----|-----|-----|-----|-----|-----|
| TP | 5 | 14 | 12 | 4 | 12 | 11 | 43 |
| FP | 1 | 2 | 2 | 1 | 4 | 2 | 9 |
| FN | 1 | 2 | 2 | 1 | 3 | 3 | 19 |
| r | 0.83 | 0.88 | 0.86 | 0.80 | 0.80 | 0.79 | 0.70 |
| p | 0.83 | 0.88 | 0.86 | 0.80 | 0.75 | 0.84 | 0.82 |
| f | 0.83 | 0.88 | 0.86 | 0.80 | 0.77 | 0.81 | 0.76 |

Note:
NDT: the number of trees detected using our method. DCT: dominant and co-dominant trees. SIT: suppressed and intermediate trees. TP: the number of correctly detected treetops. FP: the number of extra treetops that did not exist in the field (commission error). FN: the number of treetops that were not detected (omission error). r: the treetop detection rate. p: the correctness of the detected treetops. f: the overall accuracy of the detected treetops.

3.2. Crown Width Estimation

Figure 8:
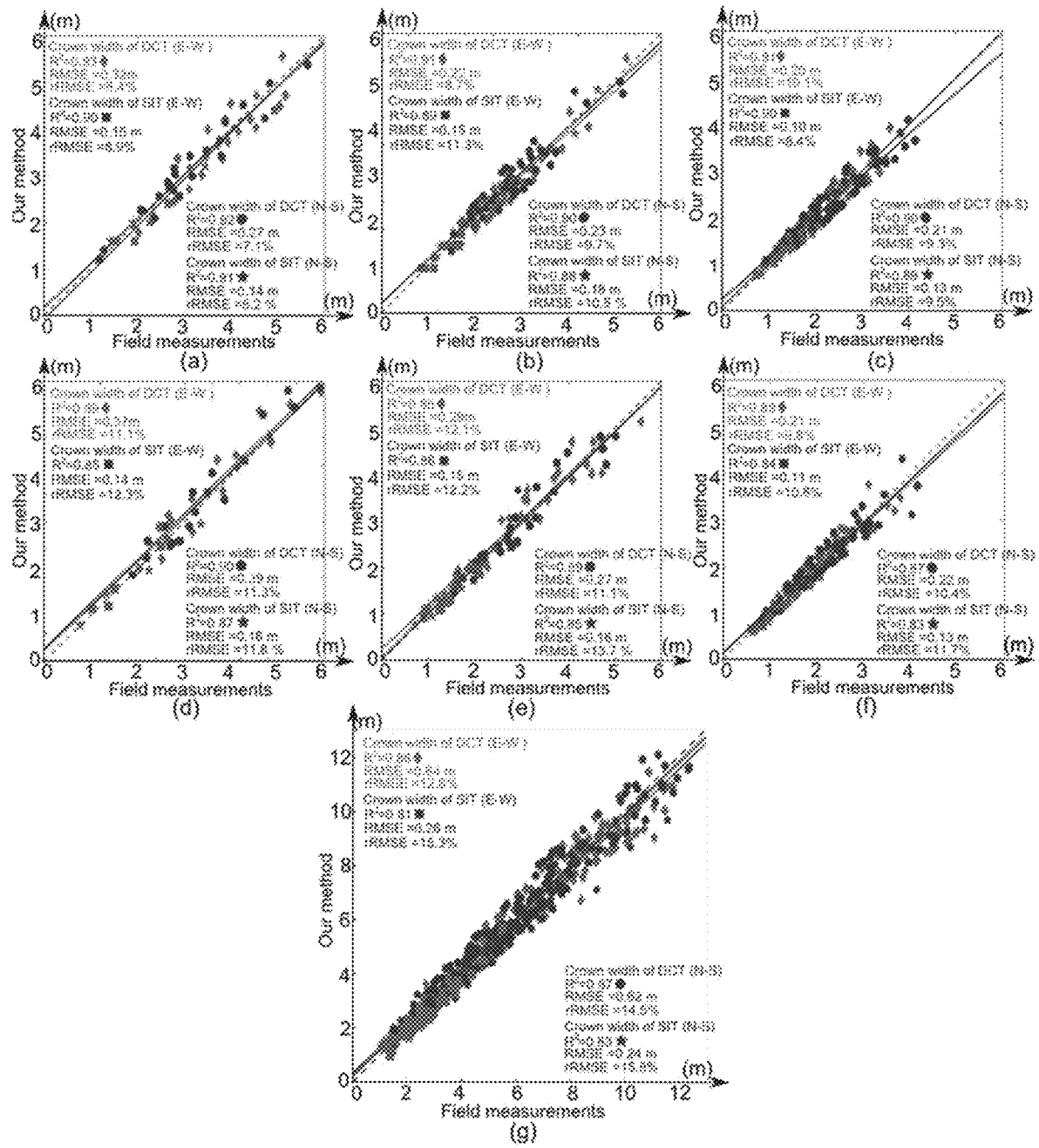
FIG. 8 is a schematic diagram of crown width estimation using our method versus field measurements. (a), (b) and (c) represent the comparison results for *Eucalyptus* plots 1, 2 and 3, as shown in FIGS. 7a, b and c, respectively. (d), (e) and (f) are the equivalent figures for Chinese fir plots 1, 2 and 3, as shown in FIG. 7d, e and f, respectively. (g) is the equivalent figure for the subset of the forest park, as shown in FIG. 7g.

FIG. 8 shows the least-squares regression of crown width estimates for the DCT and SIT obtained by our method against the field measurements. The three *Eucalyptus* plots (FIGS. 8*a, b* and *c*) demonstrate a strong correlation with a high degree of correspondence between values. This is the case for both DCT ($R^2$=0.91±0.01, RMSE=0.26±0.06 m and rRMSE=8.6±1.5%) and SIT ($R^2$=0.89±0.02, RMSE=0.14±0.04 m and rRMSE=9.8±1.5%). In the three Chinese fir plots (FIGS. 8*d, e* and *f*), the regression fit of the crown width estimation was slightly weaker for both DCT ($R^2$=0.89±0.01, RMSE=0.30±0.09 m and rRMSE=10.9±1.1%) and SIT ($R^2$=0.85±0.02, RMSE=0.13±0.03 m and rRMSE=12.3±1.4%). A lower level of correlation between field and airborne LiDAR estimations of crown widths was found in the $7^{th}$ plot of the forest park for both DCT ($R^2$=0.87±0.01, RMSE=0.63±0.01 m and rRMSE=13.5±0.9%) and SIT ($R^2$=0.82±0.01, RMSE=0.25±0.01 m and rRMSE=15.5±0.03%), as shown in FIG. 8*g*. Meanwhile, in all study sites there was a general pattern of underestimation of the crown width for SIT.

See FIG. 8. Crown width estimation using our method versus field measurements. Grey rhombuses and circles represent crown widths of DCT in the east-west and north-south orientations, respectively; grey squares and pentagrams represent crown widths of SIT in the east-west and north-south orientations, respectively. Regression lines for each magnitude of DCT are presented as grey lines relative to 1:1 (grey dashed line). (a), (b) and (c) represent the comparison results for *Eucalyptus* plots 1, 2 and 3, as shown in FIGS. 7*a, b* and *c*, respectively. (d), (e) and (f) are the equivalent figures for Chinese fir plots 1, 2 and 3, as shown in FIG. 7*d, e* and *f*, respectively. (g) is the equivalent figure for the subset of the forest park, as shown in FIG. 7*g*.

3.3. Comparison with Existing Methods

Figure 9:
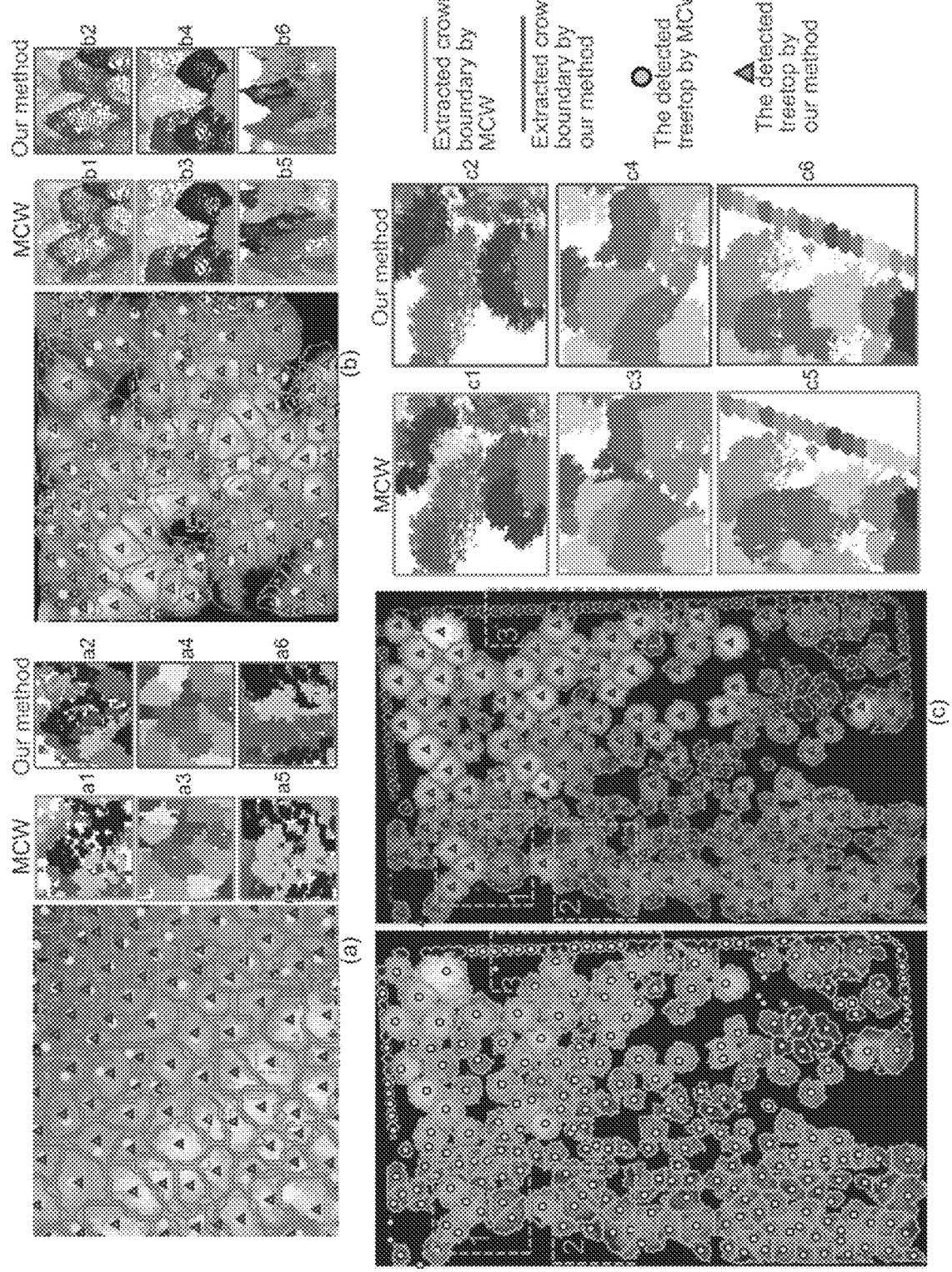
FIG. 9 is a schematic diagram of Airborne LiDAR data from three forest plot types. (a) *Eucalyptus* planation, (b) Chinese fir plantation and (c) forest park.

We selected one *Eucalyptus* plot, one Chinese fir plot and the park landscape for a comparative appraisal (plots shown in FIGS. 7*c, f* and *g*, respectively) of the crown segmentation performance using our method versus MCW. The results are presented in FIG. 9 and Table 3. In FIG. 9, the light grey borders represent the segmentation results obtained using MCW, and the borders with darker colour represent the results obtained using our method. The rate of treetop detection is dependent on the efficacy of the DSM filtering process. Errors where generated when using MCW based on a single smoother in areas with complex canopies, which our method was able to resolve. For example, in the *Eucalyptus* and Chinese fir plots, MCW was unable to consistently separate neighbouring trees growing on a slope when a continuous height decline created seemingly unbroken crown surfaces (the deep blue and the earth-yellow trees shown in FIG. 9*a*2 were successfully separated by our method, but not by the MCW, with the latter unsuccessful identification result shown in FIG. 9*a*1). Another source of error in the MCW results was small sub-canopy trees surrounded by larger crowns with uneasily detectable features (based on comparing the identification results containing earth-yellow trees identified using our method is shown in FIG. 9*a*4 with those in FIG. 9*a*3 derived by MCW. Similarly, the small pink and green trees in b2 and the small red trees in b4 identified by our method were overlooked by MCW, as shown in b1 and b3, respectively). Finally, MCW failed to detect when two closely adjacent trees had interlocking crowns, as well as the small trees beneath these crowns (the deep-sky blue tree in $a_6$ and green-yellow small tree in b6 were successfully detected by our method but not by MCW, with the unsatisfactory results shown in a5 and b5, respectively).

See FIG. 9. Airborne LiDAR data from the (a) *Eucalyptus* planation, (b) Chinese fir plantation and (c) forest park, corresponding to those in FIGS. 7*c, f* and *g*, respectively. Subsections compare the tree crown segmentation using the marked-control watershed method (MCW) versus our method presented herein. The magnifications on the right side of each figure illustrate pairwise comparisons of some problematic tree segments, and in all cases, the issues discovered using MCW were overcome or alleviated by our method. These included the prevention of omission errors for small tree crowns obstructed by adjacent larger crowns (a2, b6 and c6), the detection of suppressed or intermediate trees (a4, b2 and b4), and the separation of complex tree crowns or overlapping foliage (a6, c2 and c4).

Furthermore, Table 3 demonstrates that some omission errors were overcome after using the dual Gaussian filters for different tree classes. The treetop detection rates r achieved were DCT-0.95 and SIT-0.86 for *Eucalyptus* plot 3*c* and DCT-0.95 and SIT-0.79 for Chinese fir plot 6*f*, which were markedly higher than the DCT-0.84 and SIT-0.57 for plot 3*c* and DCT-0.89 and SIT-0.50 for plot 6*f* achieved using the existing filtering process of MCW, respectively. The values of p in Table 3 also show that the commission error of treetop detection from the existing filtering process was also reduced using our approach due to the additional treetop screening strategy in our filtering process. Meanwhile, errors in treetop detection propagate to the crown width estimation and crown delineation capability of MCW. Our method was proven superior in processing trees with undulating upper surfaces and shallow gradients. Estimates of the crown width $R^2$ for DCT and SIT using MCW were nearly 5-8% lower than those from our approach for the 3*c* and 6*f* plots, indicating a greater correspondence of our method with field measurements.

TABLE 3

Comparison results of treetop detection and crown delineation using our method versus the marked-control watershed method (MCW).

| | | Plot | | | | | |
| --- | --- | --- | --- | --- | --- | --- | --- |
| | | 3 c | | 6 f | | 7 g | |
| Approach | | MCW | Our method | MCW | Our method | MCW | Our method |
| DCT | TP | 56 | 63 | 68 | 71 | 204 | 221 |
| | FP | 5 | 3 | 6 | 5 | 27 | 13 |
| | FN | 10 | 3 | 8 | 4 | 30 | 16 |
| | r | 0.84 | 0.95 | 0.89 | 0.95 | 0.87 | 0.93 |
| | p | 0.91 | 0.95 | 0.91 | 0.93 | 0.88 | 0.94 |
| | $R^2$ | 0.855 ± 0.015 | 0.905 ± 0.005 | 0.820 ± 0.020 | 0.880 ± 0.010 | 0.790 ± 0.030 | 0.875 ± 0.005 |
| SIT | TP | 8 | 12 | 6 | 11 | 26 | 43 |
| | FP | 2 | 2 | 2 | 2 | 8 | 9 |
| | FN | 6 | 2 | 6 | 3 | 36 | 19 |
| | r | 0.57 | 0.86 | 0.50 | 0.79 | 0.42 | 0.70 |
| | p | 0.80 | 0.86 | 0.75 | 0.84 | 0.76 | 0.82 |
| | $R^2$ | 0.835 ± 0.020 | 0.895 ± 0.005 | 0.770 ± 0.015; | 0.850 ± 0.010 | 0.745 ± 0.025 | 0.835 ± 0.005 |

Note:
DCT: dominant and co-dominant trees. SIT: suppressed and intermediate trees. TP: the number of correctly detected treetops. FP: the number of extra treetops that did not exist in the field (commission error). FN: the number of treetops that were not detected (omission error). r: the treetop detection rate. p: the correctness of the detected treetops. $R^2$: the coefficient of determination for tree crown width estimation.

Finally we considered the landscape of the forest park, where complex canopy structures present challenges for any canopy segmentation algorithm. Versus FIG. 9c2, FIG. 9c1 shows that MCW mistakenly separates a single large canopy into several components due to false treetops created by foliage clumps and strong lateral branches. FIGS. 9c3 and c4 demonstrate that inaccuracies arise through the MCW method because asymptotic water expansion only depends on a downward trend of altitude, without an evaluation criterion for the intersection or edge areas. Combined with gradient information, FIG. 9c4 shows that our method overcomes the drawbacks and improves the resolution of crown boundary depiction. FIG. 9c6 paired with c5 illustrates a strengthened ability of our method in SIT detection when taller trees extend their canopies over parts of small trees. All these complications resulted in a relatively lower treetop detection rate r of 0.42 for SIT by MCW relative to a higher value of 0.70 for r using our method. When considering only correctly detected tree crowns, Table 3 shows that our method retains a higher correspondence between estimated and field-measured crown widths than does MCW.

4. Discussion

There are two major challenges to identifying tree crowns from airborne laser scanning which our method addresses. First, treetop detection errors are common in inhomogeneous forest plots, including both omission errors for sub-canopy trees or those with narrow or sparse crowns, and commission errors when trees have multiple trunks or strong lateral branches. Second, the accuracy of tree crown segmentation declines when neighbouring tree crowns intersect, especially in the overlapping area lacking distinct boundary features. Our method is able to partially compensate for both of these issues.

4.1. Treetop Detection

Efficacy of treetop detection varies depending on forest type. Our study first considered *Eucalyptus* trees in the first plot type (FIGS. 7a, b and c), as a fast-growing hardwood timber species with strong competition for soil nutrient uptake, which form relatively uniformly cylindrical tree crowns, with individuals planted in a regular arrangement. This prevents incursion from other tree species, and there is usually very little forest understory. As a less-profitable silvicultural crop, Chinese fir stands in the second plot type (FIGS. 7d, e and f) are commonly neglected or allowed to grow beyond the optimal harvest size. Therefore, mixed-species stands of regenerating broad-leaved trees grow in these plots, with locally protruding branches and multi-foliage clumps, leading to the development of complex, heterogeneous canopies and generating commission errors when detecting treetops. Hence, the simple structures of *Eucalyptus* trees make treetop detection easier than that in Chinese fir plots. A small number of omission errors in treetop detection for DCT in both *Eucalyptus* and Chinese fir plots occurred largely due to either natural disturbances, which resulted in damage to canopies and atypical morphological characteristics, or due to trees located at the edge of the survey plot with one section cut away according to the defined boundaries of the sample plot, resulting in incompletely scanned points. A higher rate of omission errors in treetop detection for SIT occurred, as SIT are always obscured by taller vegetation and often difficult to separate from surrounding material.

For the third plot type of the complex forest park, a relatively high treetop detection rate r for DCT occurred, which might be attributed to the regular pruning of mature trees to maintain compact crowns and visually appealing tree structures for aesthetic reasons. However, a lower treetop detection rate r for SIT exists due to three factors. First, signs and large stones in the park created point clouds that were falsely identified as tree crowns, generating commission errors. Second, areas of tightly-packed tree saplings in immature canopies presented interlocked crowns, and smaller branches in crowns were misidentified as treetops due to a lack of clear apices in the dense foliage, which easily produce omission and commission errors, respectively. Finally, some small shade-tolerant trees, e.g., *Loropetalum* spp., with height≤1.5 m were planted beneath the larger trees with heights ranging from 8-16 m and therefore occluded from a top-down perspective, yielding further omission errors.

4.2. Tree Crown Boundary Segmentation

The pure *Eucalyptus* forest plots had a relatively homogenous structure with leaf area index (LAI) values ranging from 1 to 3, which reduces evaporation loss and benefits sunlight bathing a larger part of the tree body. This also enables a relatively clear view of canopy elements from unmanned aircraft, facilitating the accurate delineation of tree crowns, even beneath the main canopy. The Chinese fir plots mixed with broad-leafed trees generated greater inter-specific competition and more efficient space filling. The vigorous growth of mixed trees causes greater biomass accumulation with higher LAI values ranging from 3 to 5 and yields greater forest dynamics, which results in multiple overlapping crowns and a strong ability for vertical spatial resource capturing by the mixed trees, even in areas distant from their stem position. The crown segmentation difficulty increases in this environment, as there are fewer contrasting features between crowns. In addition, further bias was present in the field validation in the three Chinese fir plots, as manual measurements were obtained in a complex woodland setting with views partially obstructed by dense vegetation elements, while the boundaries of tree crowns are often indistinct due to interlacing branches. It is therefore to be expected that alignment between the two methods would be reduced.

For the forest park, despite the low overall tree density of 0.03 tree/m², the tree distribution was highly clustered with many open areas for tourists to rest and walk, which reflects that the planting densities differ greatly with the higher species richness in the 7th plot. Variations in plant spreading and plant heights due to artificial arrangement by park growers generates a beautiful landscape and brings occlusion to the forest mid-story component in the top-down views obtained using airborne LiDAR. Hence, many sub-canopy trees (e.g., *Loropetalum* spp.) constituting the SIT were mistaken as elements of larger tree crowns, resulting in the overestimation of DCT crown widths and underestimation of the SIT crown widths. Some DCT trees with multiple trunks were deliberately encouraged to grow in spatially separate foliage clumps and produce the spurious appearance of multiple tree crowns, thus causing underestimation of the crown widths of DCT.

In all the studied forest plots, the crown widths in the east-west and north-south directions obtained using our method were calculated as the lengths of the depicted tree crown domain along two perpendicular axes from the tree-top location. When the apex of the treetop is not vertically aligned with the trunk position, as is common for trees exposed to light from the side, we expect to find discrepancies between our approach and in-situ measurement. This can be exacerbated by highly irregular crown drip lines.

4.3. Segmentation Framework and Perspective

Many previous studies have addressed the two issues discussed above. In terms of treetop detection, some existing methods attempted to extract directly to 3D point clouds (Vega et al., 2014), which have advantages in recognizing sub-canopy trees when viewed from multiple angles, but difficulties arise when complications arise such as, the locally conjunction of 3D point clouds impairing whole individual crown recognition (Ramiya et al., 2019), unsuitable selection of the direction of the reference plane in the projection (Harikumar et al., 2019) and uncertain judgements as to which point clusters represent single tree crowns or multiple trees (Amiri et al., 2018). In general, therefore, the treetop detection methods from 2D CHM or DSM still exhibit convenience and superiority. However, locating the local maxima with a single-Gaussian filter smoothing possibly causes a dilemma without the flexible identification capacity to distinguish sub-canopy trees and minimize the interference derived from locally protruding branches. Therefore, our dual Gaussian filter combined with a treetop screening strategy enables flexible smoothing for dominant and suppressed trees, which strengthens the smoothing efficacy for larger tree crowns and reserves the traits of the remaining un-occluded portions of small trees as much as possible to facilitate treetop detection, meanwhile including a few more parameters that need to be locally calibrated. Actually, any filtering method is likely to be challenged when encountering around 60,000 potential tree species in numerous types of forests worldwide. Coupled with experience-based knowledge of foresters regarding the particular morphological features of different tree species, our filtering method inspired by a dual Gaussian filter affords a more understandable and intuitive process for users.

In terms of tree crown boundary delineation, ITC segmentation directly from point clouds commonly adopts a clustering algorithm to decompose the airborne LiDAR data into different homogeneous groups (Ferraz et al., 2012). The performance of this kind of algorithm is susceptible to interference from unevenly distributed point clouds, localized data deficiency caused by occlusion and pendulous branches yielding certain conjunctions of neighbor crowns. Meanwhile, methods performed directly on the scanned points that necessarily consider the entire spatial point clouds require more time compared to those based on the CHM or DSM in two dimensions (Aubry-Kientz et al., 2019). On the other hand, some advanced ITC segmentation algorithms based on the CHM or DSM are susceptible to parameter settings, such as multi-weights for the calculation of the edge value of the connected graph (Strîmbu and Strîmbu, 2015), height-related thresholds and sufficient training samples for various forest types (Liu et al., 2015). These methods bring novel conceptual systems for ITC segmentation but yield new issues behind the theoretical framework that need to be solved (Zhou et al., 2020).

Our method makes significant improvements on the basis of the existing MCW approach but is affected by the following factors. (1) Different LiDAR point densities present variable levels of crown appearance descriptions and determine the raster cell size of the DSM conveying detailed forest canopy information. A relatively lower density of a point cloud paired with a sparse and small tree crown results in some omission errors and blurred edge descriptions. Under a high point density >100 points per m², Table 3 shows a clear improvement in the detection of SIT (>70%) using our method relative to MCW. (2) Occlusion generally causes less than half of the leaf area to be captured by aerial scanning when the LAI ranges from 3 to 5 (Yun et al., 2019). These adverse effects plague tree crown width estimation, especially for sub-canopy trees, which results in an underestimation of the crown width of SIT, as shown in FIG. 8, due to the existence of partial blind regions of the tree crowns. (3) Taking each treetop as the vertex, the designed strategy of 2D Delaunay triangulation on the DSM was beneficial for separately controlling the water expansion in each tree crown based on various subdivided triangles to better depict the anisotropic shapes of tree crowns (FIG. 5e). Nevertheless, for the trees located at edge areas of the plot without enough adjacent treetops on one side, the resulting obtuse triangle with a narrow area had a certain probability of excessive water expansion that impaired the performance of our method. This method is therefore subject to boundary effects in small plots, though these will be reduced with increasing plot size.

Our ITC segmentation was conducted based on a DSM rather than a CHM (i.e., the height difference between the ground surface and top of the trees) because the underlying ground surface was occluded by the lush overstory components in the top-down scanning pattern of the airborne LiDAR. A complementary trail in the dense forest plot in the Gaofeng woodland is supplied in second embodiment, where a serious ground data deficiency existed, and the convincing ITC segmentation results in the DSM were validated by local forestry departments. Under such conditions, the derivation of DTM of dense forests through the interpolation of airborne LiDAR data possibly propagates errors in the obtained CHM. Likewise, for hilly or mountainous forests growing on slopes with larger inclination angles, the CHM calculation may yields different degrees of height changes and leads to local deformation of the point cloud geometry within the tree crowns, which results in structural inconsistencies that might affect both the segmentation process and crown attribute characterization (Vega et al., 2014). As trees can detect gravity using tiny structures within the cells of their roots and shoots (Lopez et al., 2014), they can grow directly upwards even on a slope, still presenting height local maximum. Therefore, crown segmentation methods (St-Onge et al., 2015; Strîmbu and Strîmbu, 2015) directly operated based on DSM are still feasible, which benefits tree crown detection with maintained local convexity conditions and avoids the generation of biased results from the CHM calculation. The only limitation of using DSM is that the tree height of a studied forest plot cannot be illustrated intuitively.

4.4. Parameters of Our Method and Algorithm Execution

In the filtering process, our dual Gaussian filter has two adjustable parameters of standard deviations. As tested on 3 different types of forest plots in Gaofeng Forests, the relationship between the two height-related standard deviations $\sigma_d$ and $\sigma_g$ can be set as $\sigma_d = a_2 \cdot \sigma_g = a_1 \cdot c_i^z$, where $a_1 \approx 0.3$ and $a_2 \approx 2$. Meanwhile, in the screening process for the false treetop exclusion, the parameter of the searching radius centred on each treetop candidate is usually assigned as half of the average tree crown width of the studied plot, and the default value of the threshold $\theta$ is set to 120°, which is suitable for many tree species in our study plots. If the studied area contains a high proportion of flat-topped tree crowns, e.g., *Albizia julibrissin* Durazz, *Albizia adianthifolia* (Schumach.) W. Wight and *Vachellia sieberiana* (DC.) Kyal. & Boatwr., the value of the threshold $\theta$ can be raised by 10°~20°. For the energy control function of equation (2), the first item on the right side of the equation affords a complementary criterion based on the gradient information and works on each step of water expansion at the cell level. The value of the first item in radians ranges from 0 to 1.57. In agreement with the variation magnitude of the second item in the height decline at the cell level ranging from 0 to 0.15 m, $\alpha$ is recommended to be a small value of $0.1 \pm 0.05$, and $\beta = 1$. For coniferous trees with tower- or column-shaped tree crowns leading to a sharp decline in height with water expansion, a relatively larger value of $\alpha$ is recommended, and vice versa for broad-leaved trees with round or spreading tree crowns.

Figure 10:
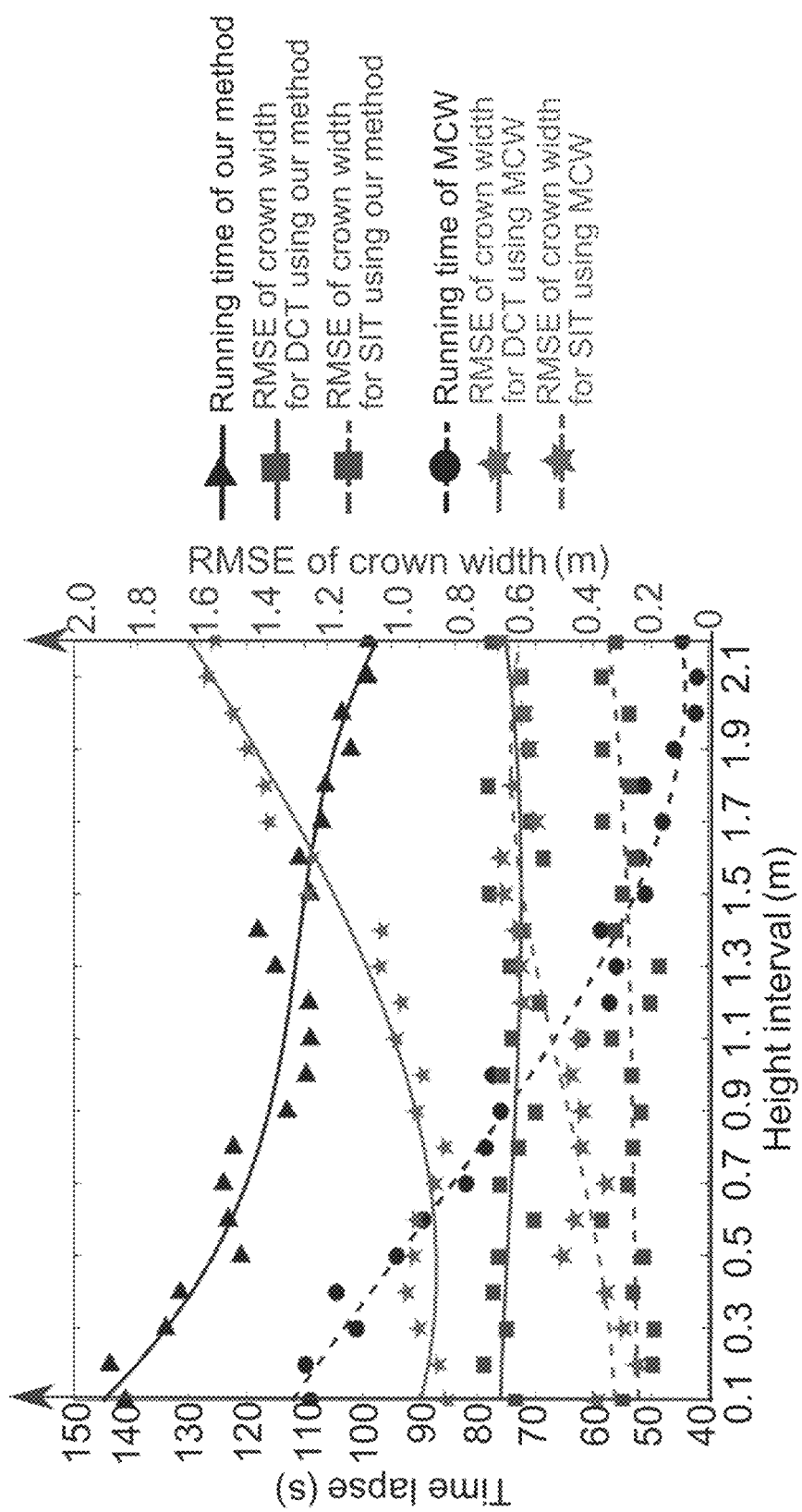
FIG. 10 is a schematic diagram showing the distribution of the calculated RMSE of the estimated crown width for DCT and SIT and the programme running time comparing our approach with MCW based on operational height interval.

Our algorithm runs on a computer with the configuration of a Core i7-6700 2.6 GHz Octa-Core Processor, 16 GB RAM, an NVIDIA GeForce GTX 960 graphics card and the Microsoft Windows 8.1 operating system. Taking the $7^{th}$ plot (FIG. 7g) as an example, FIG. 10 shows the variations in the RMSE of crown width estimation and time consumption using our method versus MCW with the changing height interval $h_j$. The relatively stable trend of the calculated RMSE values using our method for DCT and SIT is represented by the red solid and dashed lines obtained cubic polynomial regression fitting shown in FIG. 10, respectively, which illustrate that our method undergoes minor effects from the variation of the tuning parameter $h_j$ due to controlling the water expansion at the cell scale, regardless of the varying value of $h_j$. In contrast, the pink lines show that the accuracy of crown width estimation using MCW decreases as the parameter $h_j$ increases, which illustrates that a larger height interval in MCW cannot afford fine-scale water expansion control and limits accurate depictions of the edge areas of tree crown.

See FIG. 10. The dual-y-axis plot showing the distribution of the calculated RMSE of the estimated crown width for DCT and SIT and the programme running time comparing our approach with MCW based on operational height interval. Lines are fitted from cubic polynomial functions.

Regarding the aspect of time consumption, the running time of our method is slightly higher than that of MCW, as shown by blue lines in FIG. 10. Our approach took approximately 40 seconds longer than MCW to process the $7^{th}$ plot (136*84 m). The time complexity of the MCW can be taken as O(n), i.e., a linear time increasing algorithm related to the size of the input n. Here, n represents the cell number of the processed DSM of the forest plot, which is determined by the cell size (resolution of the raster) and the processed forest plot area. Although an energy-control mechanism based on height and gradient information constraints was designed in our approach and enacted in each step for water expansion control, the calculation of specific magnitude differences between the current cell and its eight surrounding neighbour cells executed to decide whether the cell will be occupied by water expansion does not add much computational complexity. Hence, our approach is considered to have a similar time complexity O(n) to that of MCW. With an increased value of the height interval and the corresponding decreased number of stratified layers, less computer input/output tasks were conducted, and fewer memory arrays were occupied by the computer system, which led to a stable downward trend of time consumption for our approach and MCW, but our method maintained an invariant accuracy in crown width estimation. When dealing with larger areas of forest plots, for example, the plot of the forest park with side lengths of 550*900 m (nearly 125 acres) shown in Figure S2 in the supplementary materials, our program required a total of 60 minutes to process the corresponding data. The divide-and-conquer (DAC) strategy (Velazquez-Iturbide et al., 2009) is recommended to subdivide the target plot into various partitions in terms of plot types, tree heights, species and site conditions, and a parallel computing technique in tandem with a super computer with a multi-task operating system can process the partitions in parallel and finally stitch together the results to reduce the processing time. When the plot shown in Figure S2 was divided into three parts for simultaneously processing crown segmentation, the total task completion time decreased to nearly 18 minutes due to the advantages of the parallel computing technique, e.g., smaller chunks of data were accessed, less instruction processing was required, and better hardware resource allocation was achieved. As the technology of hardware industry is constantly evolving and computing power is continually improving over time, the original time complexity O(n) of crown segmentation can be changed to O(log n), i.e., a deceleration of the increase of the time consumption will occur as n increases using the DAG strategy.

5. Conclusions

Identifying individual tree crowns in point clouds derived from airborne LiDAR mapping of closed-canopy forests remains a challenge. A novel ITC segmentation method based on the computer vision theory was proposed herein, which combines a dual Gaussian filters and a treetop screening strategy to achieve a flexible filtering process for varying tree sizes and the exclusion of false treetops generated by later branches. Meanwhile, an energy control function with two constraint conditions, i.e., the height difference and gradient information of DSM, were built in and pursuit of the minimum value of the energy function during the course of water expansion, driving the question of crown segmentation toward a better solution. During validation at 7 different forest plots belonging to 3 forest plot types according to the afforded field measurements, the treetop detection rate was ≥93% for DCT and ≥70% for SIT. Meanwhile, the coefficient of determination $R^2$ for tree crown width estimation was ≥0.87 for DCT and ≥0.81 for SIT. Our algorithm shows promise for use in detailed mapping over different plot types of closed-canopy broadleaf ecological forests, mixed broadleaf-conifer woodlands and urban forest landscapes that interact with manual intervention or ecological resilience. Therefore, our method, with its already existent flexibility, in tandem with high-performance computer servers, represents a shift towards detailed mapping over larger areas, affording spatial structure information for forest management, carbon stock estimation and habitat mapping.

Second Embodiment

A rectangular-shaped forest plot located in the Gaofeng Forest with side lengths of 285*175 m was used for a complementary experiment to show the robustness of our algorithm. The plot is a mixed lush forest comprising various tree species, such as Eucalyptus (*Eucalyptus robusta* Sm.), Chinese fir (*Cunninghamia lanceolata* Hook.), cinnamon (*Cinnamomum cassia* (L.) J.Presl), star anise (*Illicium verum* Hook.f.) and *Manglietiastrum sinicum* Y. W. Law, and the location is on a hillside with uneven elevation (elevation differences of between 35-110 m). Due to the local natural climate and geographical conditions suitable for tree growth, the subtropical forest with fuzzy canopy boundaries and higher leaf area index (LAI>3) result in serious interception of laser beams emitted from airborne LiDAR by vegetative elements, which causes data deficiency of the ground surface and makes the tree crown difficult to identify.

Figure 11:
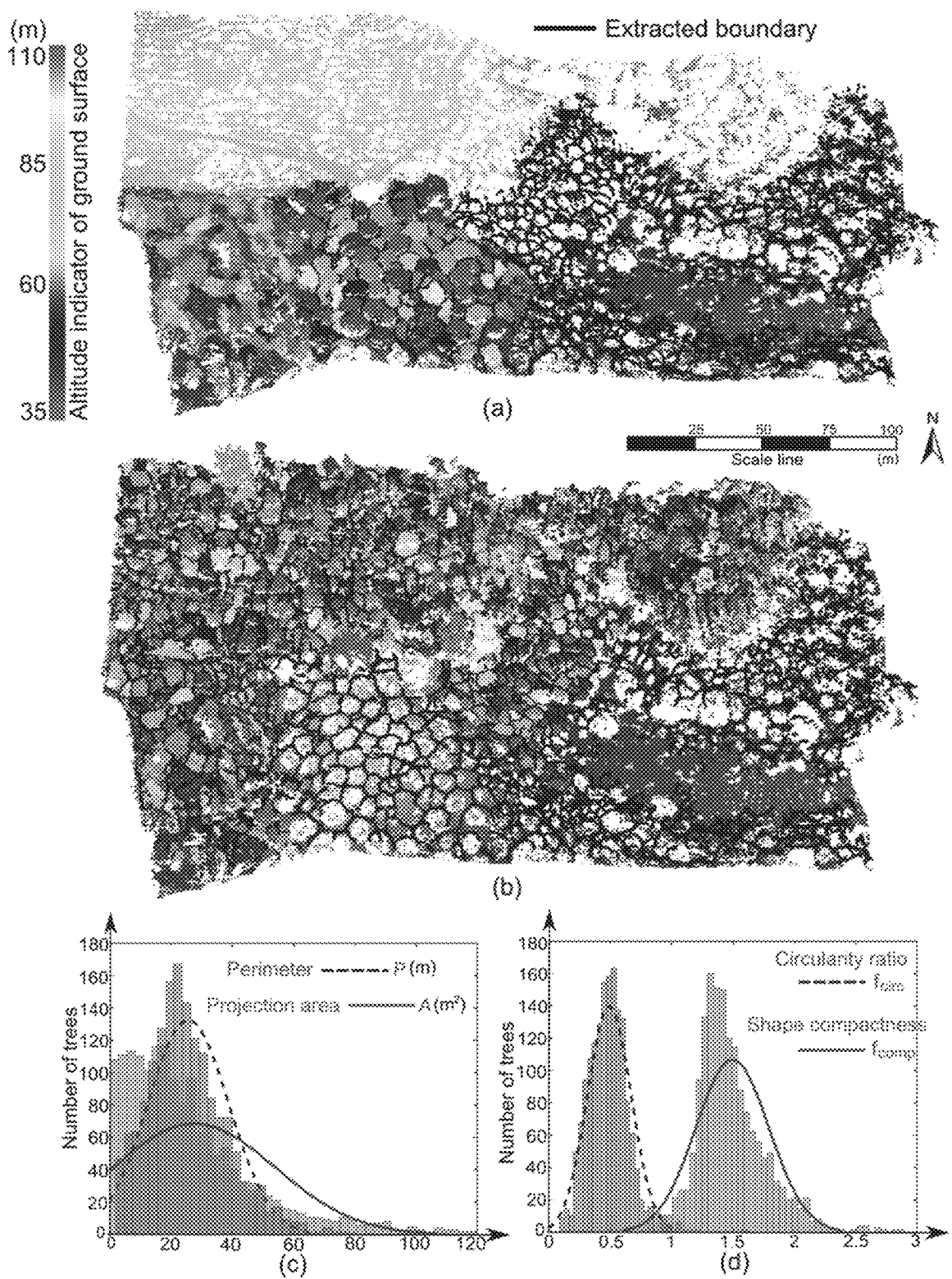
FIG. 11 is a schematic diagram of ITC segmentation and results analysis using our method.

FIG. 11 shows that many voids in the extracted LiDAR data of the ground surface were produced by the interception of laser beams by porous tree crown envelopes. Hence, the DSM of the plot was directly taken to realize the ITC segmentation for our algorithm, which avoids the deviation that occurs in the calculated CHM. FIGS. 11a and b adopt multi-display patterns to show the efficacy of our algorithm, where the point clouds of each segmented tree crown are highlighted in different colours and the extracted tree boundaries are represented in black. The obtained crown boundaries are analogous to the valley lines in terms of maintaining the principle of local minima. A total of 1756 trees were extracted from the scanned data of the plot. The average area of each tree crown and the estimated crown width are approximately 24.2 m² and 5.7 m, respectively, which was consistent with mapped stem field data from the Guangxi Zhuang Autonomous Region Forestry Research Institute.

In addition, the perimeter P and the area A of each delineated tree crown in the plot are presented in the histogram in FIG. 11c. The circularity ratio $f_{circ}=4\pi A/P^2$ and the shape compactness $f_{comp}=P/(2\sqrt{\pi A})$ were introduced to describe the natural boundaries of the tree crown in the plot, and the distribution of the two variable is shown in FIG. 11d.

$f_{circ}$ is a certain quantitative expression of the circularity of a tree crown boundary. The closer the value of $f_{circ}$ is to 1, the more the tree crown shape is similar to a circle. $f_{comp}$ is a numerical quantity representing the degree to which a tree crown shape is compact. In the natural forest with a higher species richness, the strengthened canopy plasticity driven by increased interspecific variability and allometric growth of different foliage clumps in space filling result in a varying morphological structure of the tree crown. The tree drip line, i.e., the outermost circumference of the tree canopy, usually presents non-smoothness, which is caused by numerically lateral spreading of branches and foliage.

As shown in FIG. 11d, $f_{circ}$ and $f_{comp}$ obey the normal distribution with the following calculated parameters: the mean value of 0.52 and the standard deviation of 0.15 for $f_{circ}$, and the mean value of 1.48 and the standard deviation of 0.29 for $f_{comp}$. The results show the increased interspecific competition and plasticity of the crown size in the mixed stand environment of the Gaofeng Forest, which optimizes the forest productivity and light utilization.

See FIG. 11. ITC segmentation and results analysis using our method. (a) and (b) multiple illustration forms showing the segmented tree crown using different grey colours and the extracted tree crown boundaries represented by black lines. (c) illustrates the distributions of the derived perimeter and projection area of the extracted tree crowns with fitted normal distribution curves represented by dashed and solid lines, respectively. (d) The equivalent figure for the distributions of the derived circularity ratio and shape compactness with fitted normal distribution curves.

Third Embodiment

Another rectangular plot of the forest park with side length of 550*900 m (approximately 125 acres) was used to show the retrieved growth properties of the dominant or co-dominant trees (DCT) and suppressed or intermediate trees (SIT) in the plot. A total of 19958 trees was detected using our algorithm. Less than 10% deviation existed compared with the benchmarks provided by the local park management according to the historical records of planted trees or dead trees in the past 10 years and field measurements of some subsets in the plot. The connectivity of each treetop with its neighbouring trees was defined by our 2D triangulation method (similarly like FIG. 5e) based on the set of detected treetops on the corresponding DSM. The segmented trees that satisfied the premise of having relatively lower heights (<10%) and smaller tree crown widths (<10%) versus its neighbouring trees were considered as SIT. Hence, totals of 17721 (88.79%) DCT and 2237 (11.21%) SIT were identified through our method. Histograms were adopted to display the distribution of the retrieved magnitudes of tree heights, average crown widths and projection area of tree crowns for DCT and SIT, which are shown by the cerise bins and jade green bins in FIGS. 12b, c and d, respectively. Meanwhile, the fitting curves of a normal distribution based on the corresponding histograms of DCT and SIT are depicted as pink and green curves, respectively. The retrieved magnitudes for DCT and SIT in the plot are given in Table 4. SIT make up only 11.12% of the total detected tree number and have barely 40% of the average tree crown width of DCT. Meanwhile, the results retrieved directly from the scanned points using our method show that SIT occupied merely 3.51% of the total vertical projection area of the forest canopy in the plot, which aligns well with the calculation results (3%) obtained using equation 7 under the hypothesis that the maximum cross-section of the tree crown presents an approximately spheroid shape.

$$\frac{p_{SIT}*(a_{SIT}/2)*(b_{SIT}/2)}{p_{SIT}*(a_{SIT}/2)*(b_{SIT}/2)+p_{DCT}*(a_{DCT}/2)*(b_{DCT}/2)} \approx 3\% \quad (7)$$

Here, $a_{SIT}$ and $b_{SIT}$ represent the major axis and minor axis of the ellipse, which simulate the average crown widths of the cross-sectional areas of SIT in two perpendicular directions. $a_{DCT}$ and $b_{DCT}$ represent the major axis and the minor axis of the ellipse, simulating the average crown widths of the cross-sectional areas of DCT in two perpendicular directions. $p_{DCT}$ and $p_{SIT}$ represent the proportion of DCT and SIT relative to the total number of the trees in the current plot, and here $p_{DCT}$=88.79% and $p_{SIT}$=11.21% according to the retrieved magnitude shown in Table 4. $r_1$ represents the ratio of the average tree crown width of DCT to that of SIT and here is assigned as 2.24 according to the retrieved value shown in Table 4. Therefore, $a_{DCT}=a_{SIT}*r_1$ and $b_{DCT}=b_{SIT}*r_1$.

FIGS. 12e and f show the segmented point clouds of SIT from a subset of the forest park plot indicated by the white dashed boundary lines in FIG. 12a. As seen from FIG. 12e, the detected SIT developed slender or small tree crowns compared with their neighbouring trees and are easily neglected due to obstruction by surrounding trees from a top-down perspective.

Figure 12:
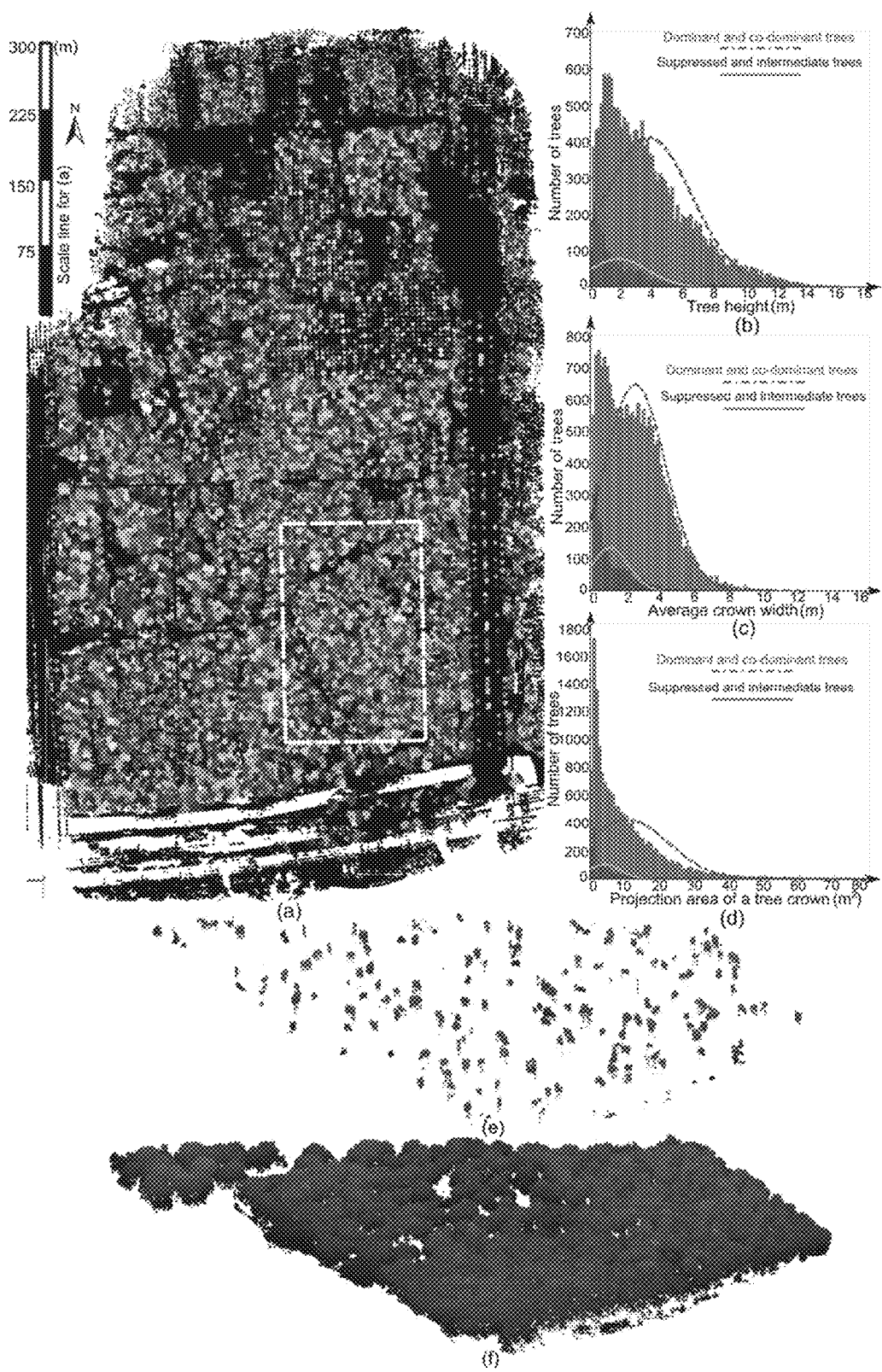
FIG. 12. is a schematic diagram interpreting the tree properties of DCT and SIT.

See FIG. 12. A forest park landscape of a larger area (550*900 m) was taken as a supplementary experiment for interpreting the tree properties of DCT and SIT. (a) The segmented point clouds of each tree crown are represented by different grey colours. (b) The two histograms illustrate the distribution of the calculated tree heights for DCT (light grey bins) and SIT (dark grey bines) with the fitted normal distribution curves represented by dash-dotted and solid curves, respectively. (c) The equivalent figure illustrating the distribution of the calculated average crown widths in two perpendicular directions for DCT and SIT. (d) The equivalent figure illustrating the distribution of the calculated projection area of each tree crown of DCT and SIT. (e) and (f) The magnification of the subset of the plot indicated by the white dashed boundary lines shown in (a), where the extracted point clouds of SIT and DCT represented by (e) and (f), respectively.

TABLE 4

The retrieved growth properties for the two classes of trees, i.e., dominant or co-dominant trees and suppressed or intermediate trees, in the forest park plot shown in FIG. 12 (a)

| | Dominant or co-dominant trees | Suppressed or intermediate trees |
| --- | --- | --- |
| Number of trees/Proportion | 17721/88.79% | 2237/11.21% |
| Tree height (m) (Range/Average) | 0.60-15.35/3.78 | 0.62-9.63/1.84 |
| Crown width (m) (Range/Average) | 0.52-14.16/2.58 | 0.53-5.76/1.15 |
| Crown projection area (m$^2$) (Range/Average/Sum) | 0.24-74.02/9.68/ 171602.29 (96.49%) | 0.21-19.75/2.79/ 6237.61 (3.51%) |

REFERENCES

Amiri, N., Polewski, P., Heurich, M., Krzystek, P., Skidmore, A. K., 2018. Adaptive stopping criterion for top-down segmentation of ALS point clouds in temperate coniferous forests. ISPRS J. Photogramm. Remote Sens. https://doi.org/10.1016/j.isprsjprs.2018.05.006

Asner, G. P., Mascaro, J., 2014. Mapping tropical forest carbon: Calibrating plot estimates to a simple LiDAR metric. Remote Sens. Environ. 140, 614-624. https://doi.org/10.1016/j.rse.2013.09.023

Aubry-Kientz, M., Dutrieux, R., Ferraz, A., Saatchi, S., Hamraz, H., Williams, J., Coomes, D., Piboule, A., Vincent, G., 2019. A Comparative Assessment of the Performance of individual Tree Crowns Delineation Algorithms from ALS Data in Tropical Forests. Remote Sens. 11, 1086. https://doi.org/10.3390/rs11091086

Burt, A., Disney, M., Calders, K., 2019. Extracting individual trees from lidar point clouds using treeseg. Methods Ecol. Evol. https://doi.org/10.1111/2041-210X.13121

Campbell, M. J., Dennison, P. E., Tune, J. W., Kannenberg, S. A., Kerr, K. L., Codding, B. F., Anderegg, W. R. L., 2020. A multi-sensor, multi-scale approach to mapping tree mortality in woodland ecosystems. Remote Sens. Environ. 245, 111853. https://doi.org/10.10164rse.2020.111853

Dai, W., Yang, B., Dong, Z., Shaker, A., 2018. A new method for 3D individual tree extraction using multispectral airborne LiDAR point clouds. ISPRS J. Photogramm. Remote Sens. 144, 400-411. https://doi.org/10.1016/j.isprsjprs.2018.08.010

Duncanson, L. I., Cook, B. D., Hurtt, G. C., Dubayah, R. O., 2014. An efficient, multi-layered crown delineation algorithm for mapping individual tree structure across multiple ecosystems. Remote Sens. Environ. 154, 378-386. https://doi.org/10.1016/j.rse.2013.07.044

Faraji, M., Shanbehzadeh, J., Nasrollahi, K., Moeslund, T. B., 2015. Extremal Regions Detection Guided by Maxima of Gradient Magnitude. IEEE Trans. Image Process. 24, 5401-5415. https://doi.org/10.1109/TIP.2015.2477215

Ferraz, A., Bretar, F., Jacquemoud, S., Gongalves, G., Pereira, L., Tome, M., Soares, P., 2012. 3-D mapping of a multi-layered Mediterranean forest using ALS data. Remote Sens. Environ. 121, 210-223. https://doi.org/10.1016/j.rse.2012.01.020

Ferraz, A., Saatchi, S., Mallet, C., Meyer, V., 2016. Lidar detection of individual tree size in tropical forests. Remote Sens. Environ. 183, 318-333. https://doi.org/10.10164rse.2016.05.028

Harikumar, A., Bovolo, F., Bruzzone, L., 2019. A Local Projection-Based Approach to Individual Tree Detection and 3-D Crown Delineation in Multistoried Coniferous Forests Using High-Density Airborne LiDAR Data. IEEE Trans. Geosci. Remote Sens. 57, 1168-1182. https://doi.org/10.1109/TGRS.2018.2865014

Holmgren, J., Lindberg, E., 2019. Tree crown segmentation based on a tree crown density model derived from Airborne Laser Scanning. Remote Sens. Lett. 10, 1143-1152. https://doi.org/10.1080/2150704X.2019.1658237

Hu, B., Li, J., Jing, L., Judah, A., 2014. Improving the efficiency and accuracy of individual tree crown delineation from high-density LiDAR data. Int. J. Appl. Earth Obs. Geoinf. 26, 145-155. https://doi.org/10.1016/j.jag.2013.06.003

Huang, J., Xing, Y., You, H., Qin, L., Tian, J., Ma, J., 2019. Particle Swarm Optimization-Based Noise Filtering Algorithm for Photon Cloud Data in Forest Area. Remote Sens. 11, 980. https://doi.org/10.3390/rs11080980

Jain, A. K., 2019. Computer Vision, in: Cutting Edge Technologies and Microcomputer Applications for Developing Countries. Routledge, pp. 109-117. https://doi.org/10.4324/9780429042522-10

Khosravipour, A., Skidmore, A. K., Isenburg, M., Wang, T., Hussin, Y. A., 2014. Generating Pit-free Canopy Height Models from Airborne Lidar. Photogramm. Eng. Remote Sens. 80, 863-872. https://doi.org/10.14358/PERS.80.9.863

Kichenassamy, S., Kumar, A., Diver, P., Tannenbaum, A., Yezzi, A., 1995. Gradient flows and geometric active contour models, in: Proceedings of IEEE International Conference on Computer Vision. IEEE Comput. Soc. Press, pp. 810-815. https://doi.org/10.1109/ICCV.1995.466855

Lindberg, E., Holmgren, J., 2017. Individual Tree Crown Methods for 3D Data from Remote Sensing. Curr. For. Reports. https://doi.org/10.1007/s40725-017-0051-6

Liu, T., Im, J., Quackenbush, L. J., 2015. A novel transferable individual tree crown delineation model based on Fishing Net Dragging and boundary classification. ISPRS J. Photogramm. Remote Sens. 110, 34-47. https://doi.org/10.1016/j.isprsjprs.2015.10.002

Lopez, D., Tocquard, K., Venisse, J.-S., Leguã©, V., Roeckel-Drevet, P., 2014. Gravity sensing, a largely misunderstood trigger of plant orientated growth. Front. Plant Sci. 5. https://doi.org/10.3389/fpls.2014.00610

Mongus, D., alik, B., 2015. An efficient approach to 3D single tree-crown delineation in LiDAR data. ISPRS J. Photogramm. Remote Sens. 108, 219-233. https://doi.org/10.1016/j.isprsjprs.2015.08.004

Mozerov, M. G., van de Weijer, J., 2015. Accurate Stereo Matching by Two-Step Energy Minimization. IEEE Trans. Image Process. 24, 1153-1163. https://doi.org/10.1109/TIP.2015.2395820

Qian, X., Wang, J., Guo, S., Li, Q., 2013. An active contour model for medical image segmentation with application to brain CT image. Med. Phys. 40, 021911. https://doi.org/10.1118/1.4774359

Ramiya, A. M., Nidamanuri, R. R., Krishnan, R., 2019. Individual tree detection from airborne laser scanning data based on supervoxels and local convexity. Remote Sens. Appl. Soc. Environ. 15, 100242. https://doi.org/10.1016/j.rsase.2019.100242

Shen, X., Cao, L., Yang, B., Xu, Z., Wang, G., 2019. Estimation of Forest Structural Attributes Using Spectral Indices and Point Clouds from UAS-Based Multispectral and RGB Imageries. Remote Sens. 11, 800. https://doi.org/10.3390/rs11070800

St-Onge, B., Audet, F.-A., Bégin, J., 2015. Characterizing the Height Structure and Composition of a Boreal Forest Using an Individual Tree Crown Approach Applied to Photogrammetric Point Clouds. Forests 6, 3899-3922. https://doi.org/10.3390/f6113899

Strîmbu, V. F., Strîmbu, B. M., 2015. A graph-based segmentation algorithm for tree crown extraction using airborne LiDAR data. ISPRS J. Photogramm. Remote Sens. 104, 30-43. https://doi.org/10.1016/j.isprsjprs.2015.01.018

Vega, C., Hamrouni, A., El Mokhtari, A., Morel, M., Bock, J., Renaud, J. P., Bouvier, M., Durrieue, S., 2014a. PTrees: A point-based approach to forest tree extraction from lidar data. Int. J. Appl. Earth Obs. Geoinf. https://doi.org/10.1016/j.jag.2014.05.001

Vega, C., Hamrouni, A., El Mokhtari, S., Morel, J., Bock, J., Renaud, J.-P., Bouvier, M., Durrieu, S., 2014b. PTrees: A point-based approach to forest tree extraction from lidar data. Int. J. Appl. Earth Obs. Geoinf. 33, 98-108. https://doi.org/10.1016/j.jag.2014.05.001

Velázquez-Iturbide, J. Á., Pérez-Carrasco, A., Urquiza-Fuentes, J., 2009. A Design of Automatic Visualizations for Divide-and-Conquer Algorithms. Electron. Notes Theor. Comput. Sci. https://doi.org/10.1016/j.entcs.2008.12.060

Wan Mohd Jaafar, W., Woodhouse, I., Silva, C., Omar, H., Abdul Maulud, K., Hudak, A., Klauberg, C., Cardil, A., Mohan, M., 2018. Improving Individual Tree Crown Delineation and Attributes Estimation of Tropical Forests Using Airborne LiDAR Data. Forests 9, 759. https://doi.org/10.3390/f9120759

Xu, Q., Cao, L., Xue, L., Chen, B., An, F., Yun, T., 2018. Extraction of Leaf Biophysical Attributes Based on a Computer Graphic-based Algorithm Using Terrestrial Laser Scanning Data. Remote Sens. 11, 15. https://doi.org/10.3390/rs11010015

Yun, T., An, F., Li, W., Sun, Y., Cao, L., Xue, L., 2016. A Novel Approach for Retrieving Tree Leaf Area from Ground-Based LiDAR. Remote Sens. 8, 942. https://doi.org/10.3390/rs8110942

Yun, T., Cao, L., An, F., Chen, B., Xue, L., Li, W., Pincebourde, S., Smith, M. J., Eichhorn, M. P., 2019. Simulation of multi-platform LiDAR for assessing total leaf area in tree crowns. Agric. For. Meteorol. 276-277, 107610. https://doi.org/https://doi.org/10.1016/j.agrformet.2019.06.009

Zhang, W., Qi, J., Wan, P., Wang, H., Xie, D., Wang, X., Yan, G., 2016. An Easy-to-Use Airborne LiDAR Data Filtering Method Based on Cloth Simulation. Remote Sens. 8, 501. https://doi.org/10.3390/rs8060501

Zhou, Y., Wang, L., Jiang, K., Xue, L., An, F., Chen, B., Yun, T., 2020. Individual tree crown segmentation based on aerial image using superpixel and topological features. J. Appl. Remote Sens. https://doi.org/10.1117/1.jrs.14.022210

Zhu, L., Wang, L., Ji, L., Yang, W., Geng, X., 2020. Multiple Targets Inequality Constrained Energy Minimization for Multispectral Imagery. Infrared Phys. Technol. 103465. https://doi.org/10.1016/j.infrared.2020.103465

What is claimed is:

1. A method of individual tree crown segmentation from airborne LiDAR data using a novel Gaussian filter and energy function minimization, comprises the following steps of:

1): generating a DSM from airborne LiDAR data for a forest plot by a rasterization method;
2): filtering the DSM based on a dual Gaussian filter;
3): detecting candidate treetops from the filtered DSM using a local-maximum-finding method, and employing a screening strategy based on an angle threshold to exclude false treetops; and
4): conducting an accurate delineation of tree crowns, after the false treetops are excluded, by a water expansion model controlled by an energy function, along with an estimation of crown width in two perpendicular directions, wherein the energy function is as follows:

$$E_{h_j}(t_k, d) = \frac{1}{n} \sum_{b=1}^{n} \left\{ \frac{\alpha}{Q_b^k} \cdot \sum_{i=1}^{Q_b^k} \left[ \arccos\left( \frac{\overrightarrow{t_k c_{i,d}^b} \cdot \nabla c_{i,d}^{b,z}}{|\overrightarrow{t_k c_{i,d}^b}| \cdot |\nabla c_{i,d}^{b,z}|} \right) \right] + \frac{\beta}{3} \sum_{l=1}^{3} \left( \overline{c_d^{b,z}} - t_{c_i^b,l}^z \right) \right\} \quad (2)$$

the DSM of each forest plot is vertically and evenly stratified into many height interval $h_j$, j=1, 2, 3 ... in top-down order based on a fixed spacing; in equation (2), $c_{i,d}^b$ represents a boundary cell of water expansion in b th triangle of a distance d to boundary cells of a previous height interval $h_{j-1}$; cells $c_d$, d=1,2,3 ... together form a concentric contour structure through water expansion with the convergent centre of treetop $t_k$, satisfying a connectivity principle; $c_{i,d}^{b,z}$ represents height of the cell $c_{i,d}^b$;

$$\nabla c_{i,d}^{b,z} = \left[ \frac{\partial c_{i,d}^{b,z}}{\partial x}, \frac{\partial c_{i,d}^{b,z}}{\partial y} \right]$$

represents the vector of a maximum gradient of the boundary cell $c_{i,d}^b$ on a DSM $C^z$ and $$\overrightarrow{t_k c_{i,d}^b}$$

represents the vector from a corresponding treetop location $t_k$ to the boundary cell $c_{i,d}^b$; arccos $$\arccos\left(\frac{\overrightarrow{t_k c_{i,d}^b} \cdot \nabla c_{i,d}^{b,z}}{|\overrightarrow{t_k c_{i,d}^b}| \cdot |\nabla c_{i,d}^{b,z}|}\right)$$

represents an included angle between a gradient vector of the boundary cell $C_{i,d}^b$ and the vector from a starting point of water expansion with the convergent centre of treetop $t_k$ to the boundary cell $c_{i,d}^b$; $Q_b^k$ represents a number of boundary cells $c_{i,d}^b$ in the b th triangle expanded from the convergent centre of treetop $t_k$ at the distance d;

$$\sum_{l=1}^{3}\left(\overline{c}_d^{b,z} - t_{c_l^b,l}^z\right)$$

represents height differences between an average height value of all water expanded boundary cells $c_{i,d}^b$ and three surrounding treetops $t_{c_l^b,l}$ three vertices of the b th triangle; $\overline{c}_d^{b,z}$ represents the average height value of the boundary cell $c_{i,d}^b$; $t_{c_l^b,l}^z$ represents heights of three surrounding treetops of the boundary cell $c_{i,d}^b$; and the coefficients $\alpha \approx 0.1$ and $$\beta = \begin{cases} 1 & \text{if } \overline{c}_d^{b,z}]: d = 1, 2, 3 \ldots \\ -1 & \text{otherwise} \end{cases},$$

where $c_d^{b,z}$ denote a monotonic decrease in the average height value of all expanded boundary cells $c_i^b$ in each height interval with increasing distance d.

2. The method of individual tree crown segmentation according to claim 1, wherein the dual Gaussian filter D(c) is as follows:

$$D(c)=C(c)*(G_1(c)+G_2(c)) \tag{1}$$

In equation (1), uniformly distributed and horizontal square grid cells $c \in C$ of size d with the assigned elevation value $c^z$ equal to the highest elevation of all scanned tree points within each cell c cover the scanned forest plot and make up the corresponding DSM $C^z$; $G_1(c)$ and $G_2(c)$ are two Gaussian smoothing filters based on a distance measure and crown shape variability measure, respectively; the square window size s of two Gaussian smoothing filters can be varied and here s is set as the half of the average crown size of the forest plot; these filters are defined as follows: $G_1(c_i)=e^{-d|c_j-c_i|^2/\sigma_d^2}$ and $G_2(c)=e^{-(c_j^z-c_i^z)^2/2\sigma_g^2}$, where $c_j$ belongs to the neighbourhood of $c_i$, $d|c_j-c_i| \leq s$ is the distance measure between neighbouring cells $c_j$ and $c_i$, and $(c_j^z-c_i^z)$ uses the height difference measure between the neighbour cell $c_j$ and $c_i$ to depict the variability in the tree crown shape; where $c_i$ represents height value of current cell $c_i^z$; the magnitudes of the standard deviations $\sigma_d$ and $\sigma_g$ of the two Gaussian smoothing filters are related to the elevation value of the cell $c_i$ on the DSM of the forest plot, i.e., $\sigma_d = \alpha_2 \cdot \sigma_g = \alpha_1 \cdot c_i^z$, where $\alpha_1$ and $\alpha_2$ are the weight coefficients and $\alpha_1 \approx 0.3$ and $\alpha_2 \approx 2$.

3. The method of individual tree crown segmentation according to claim 1, the screening strategy based on an angle threshold is as follows:

a included angle θ between the lowest local scanned point and the adjacent candidate treetops on both sides is calculated, which is taken as an index to distinguish the true treetops belonging to each crown and remove false treetops;

when θ≥threshold, the candidate treetops are considered to be formed by later branches or separate foliage clumps belonging to the same tree crown, and one candidate treetop was deleted; when θ<threshold, the canopy heterogeneity produced by different tree crowns creates gaps between trees.

4. The method of individual tree crown segmentation according to claim 3, threshold=120°-140°.

* * * * *